United States Patent
Zhang

(10) Patent No.: US 12,184,923 B2
(45) Date of Patent: Dec. 31, 2024

(54) ACTION SYNCHRONIZATION FOR TARGET OBJECT

(71) Applicant: Tencent Technology (Shenzhen) Company Limited, Guangdong (CN)

(72) Inventor: Wenjie Zhang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 39 days.

(21) Appl. No.: 17/968,747

(22) Filed: Oct. 18, 2022

(65) Prior Publication Data

US 2023/0042654 A1    Feb. 9, 2023

Related U.S. Application Data

(63) Continuation of application No. PCT/CN2021/134541, filed on Nov. 30, 2021.

(30) Foreign Application Priority Data

Dec. 4, 2020  (CN) .......................... 202011413461.3

(51) Int. Cl.
*H04N 21/43*     (2011.01)
*G06F 40/205*    (2020.01)
(Continued)

(52) U.S. Cl.
CPC ..... *H04N 21/43072* (2020.08); *G06F 40/205* (2020.01); *G06V 40/171* (2022.01);
(Continued)

(58) Field of Classification Search
CPC ........... H04N 21/43072; H04N 19/132; H04N 21/2368; H04N 7/157; H04N 21/2187;
(Continued)

(56) References Cited

U.S. PATENT DOCUMENTS

2010/0202696 A1*  8/2010  Usui .................... G06V 40/175
                                                          382/190
2018/0268807 A1*  9/2018  Agiomyrgiannakis ......................
                                                          G10L 13/047

(Continued)

FOREIGN PATENT DOCUMENTS

CN          110277099 A      9/2019
CN          111028318 A      4/2020
(Continued)

OTHER PUBLICATIONS

Suwajanakorn et al. "Synthesizing Obama: Learning Lip Sync from Audio", ACM Transactions on Graphics, vol. 36, No. 4, Article 95, Jul. 2017 (See IDS dated Oct. 18, 2022) (Year: 2017).*

(Continued)

*Primary Examiner* — Richard A Hansell, Jr.
(74) *Attorney, Agent, or Firm* — ArentFox Schiff LLP

(57) ABSTRACT

A method for synchronizing an action of a target object with source audio is provided. Facial parameter conversion is performed on an audio parameter of the source audio at different time periods to obtain source parameter information of the source audio at the respective time periods. Parameter extraction is performed on a target video that includes the target object to obtain target parameter information of the target video. Image reconstruction is performed on the target object in the target video based on the source parameter information of the source audio and the target parameter information of the target video, to obtain a reconstructed image. Further, a synthetic video is generated based on the reconstructed image, the synthetic video including the target object, and the action of the target object being synchronized with the source audio.

19 Claims, 9 Drawing Sheets

(51) Int. Cl.
*G06V 40/16* (2022.01)
*H04N 19/132* (2014.01)
*H04N 21/2368* (2011.01)

(52) U.S. Cl.
CPC ......... *G06V 40/176* (2022.01); *H04N 19/132* (2014.11); *H04N 21/2368* (2013.01)

(58) Field of Classification Search
CPC ..... H04N 21/23412; H04N 21/234336; H04N 21/251; H04N 21/8146; G06F 40/205; G06V 40/171; G06V 40/176; G06V 10/82; G06T 15/00; G06N 3/044; G06N 3/045; G10L 15/02; G10L 15/063; G10L 15/16; G10L 15/25
See application file for complete search history.

(56) References Cited

U.S. PATENT DOCUMENTS

| | | | | |
|---|---|---|---|---|
| 2020/0118544 | A1* | 4/2020 | Lee | G10L 15/063 |
| 2020/0126584 | A1* | 4/2020 | Huang | G10L 21/10 |
| 2021/0306557 | A1* | 9/2021 | Voss | H04N 5/272 |
| 2022/0059116 | A1* | 2/2022 | Sakaguchi | G10L 21/14 |
| 2022/0293091 | A1* | 9/2022 | Pan | G10L 25/63 |

FOREIGN PATENT DOCUMENTS

| | | | | |
|---|---|---|---|---|
| CN | 111506064 | A | 8/2020 | |
| CN | 113554737 | A | 10/2021 | |
| EP | 3745394 | A1 * | 12/2020 | ............. G06N 3/045 |
| WO | WO-2020098686 | A1 * | 5/2020 | ......... G06F 18/2413 |
| WO | 2020155299 | A1 | 8/2020 | |

OTHER PUBLICATIONS

Kumar et al. "ObamaNet: Photo-realistic lip-sync from text" 31st Conference on Nueral Information Processing Systems (NIPS 2017 ), Long Beach, CA, USA, submitted arXiv: 1801.01442, Dec. 6, 2017 (See IDS dated Oct. 18, 2022) (Year: 2017).*
Thies et al. Neural Voice Puppetry: Audio-driven Facial Reenactment , preprint of the ECCV2020 article, obtained from arXiv: 1912.055667v2, Jul. 29, 2020 (Year: 2020).*
International Search Report and Written Opinion issued in International Application No. PCT/CN2021/134541, mailed Feb. 28, 2022, with English Translation, 10 pages.
Suwajanakorn S, Seitz S M, Kemelmacher-Shlizerman I. Synthesizing obama: learning lip sync from audio[J]. ACM Transactions on Graphics (TOG), 2017, 36(4): 1-13.
Kumar R, Sotelo J, Kumar K, et al. Obamanet: Photo-realistic lip-sync from text[J]. arXiv preprint arXiv:1801.01442, 2017.
Thies J, Elgharib M, Tewari A, et al. Neural voice puppetry: Audio-driven facial reenactment[J]. arXiv preprint arXiv:1912.05566, 2019.
Song L, Wu W, Qian C, et al. Everybody's Talkin': Let Me Talk as You Want[J]. arXiv preprint arXiv:2001.05201, 2020.
Yi R, Ye Z, Zhang J, et al. Audio-driven Talking Face Video Generation with Natural Head Pose[J]. arXiv preprint arXiv:2002.10137, 2020.
Sotelo J, Mehri S, Kumar K, et al. Char2wav: End-to-end speech synthesis[J]. 2017.
Ronneberger O, Fischer P, Brox T. U-net: Convolutional networks for biomedical image segmentation[C]//International Conference on Medical image computing and computer-assisted intervention. Springer, Cham, 2015: 234-241.
Hannun A, Case C, Casper J, et al. Deep speech: Scaling up end-to-end speech recognition[J]. arXiv preprint arXiv:1412.5567, 2014.
Zhu X, Liu X, Lei Z, et al. Face alignment in full pose range: A 3d total solution[J]. IEEE transactions on pattern analysis and machine intelligence, 2017, 41(1): 78-92.
Newell A, Yang K, Deng J. Stacked hourglass networks for human pose estimation[C]//European conference on computer vision. Springer, Cham, 2016: 483-499.

* cited by examiner

ACTION SYNCHRONIZATION FOR TARGET OBJECT

RELATED APPLICATIONS

The present application is a continuation of International Application No. PCT/CN2021/134541 filed on Nov. 30, 2021, which claims priority to Chinese Patent Application No. 202011413461.3 filed on Dec. 4, 2020. The entire disclosures of the prior application are hereby incorporated by reference in their entirety.

FIELD OF THE TECHNOLOGY

This application relates to the field of Internet technologies, including an action driving method, apparatus, and device of a target object, a computer-readable storage medium, and a computer program product.

BACKGROUND OF THE DISCLOSURE

In recent years, in the field of lip-sync speech video generation, synchronization may be implemented based on deep learning. In the related art, one implementation method is to learn mouth key points from an audio feature by using a recurrent neural network, then generate mouth texture based on information of the mouth key points, and finally combine the mouth texture with a target video frame, to obtain lip-sync speech video frames. In another implementation method a common and shared "audio-expression" space is learned according to a plurality of sound clips from different sources, and then final lip-sync speech video frames are determined according to expression parameters obtained.

However, the final lip-sync speech video frames generated by the methods in the related art may not be smooth and may appear to be unnatural.

SUMMARY

Embodiments of this disclosure include an action driving method, such as a method for synchronizing an action of a target object with source audio. An apparatus, device of a target object, a non-transitory computer-readable storage medium, and a computer program product are also provided. Embodiments of this disclosure can improve the smoothness and reality of a finally obtained synthetic video.

Technical solutions of exemplary embodiments of this disclosure are further described below.

An embodiment of this disclosure provides a method for synchronizing an action of a target object with source audio is provided. Facial parameter conversion is performed on an audio parameter of the source audio at different time periods to obtain source parameter information of the source audio at the respective time periods. Parameter extraction is performed on a target video that includes the target object to obtain target parameter information of the target video. Image reconstruction is performed by processing circuitry on the target object in the target video based on the source parameter information of the source audio and the target parameter information of the target video, to obtain a reconstructed image. Further, a synthetic video is generated based on the reconstructed image, the synthetic video including the target object, and the action of the target object being synchronized with the source audio.

An embodiment of this disclosure provides an information processing apparatus that includes processing circuitry. The processing circuitry is configured to perform facial parameter conversion on an audio parameter of a source audio at different time periods to obtain source parameter information of the source audio at the respective time periods. The processing circuitry is configured to perform parameter extraction on a target video that includes a target object to obtain target parameter information of the target video. The processing circuitry is configured to perform image reconstruction on the target object in the target video based on the source parameter information of the source audio and the target parameter information of the target video, to obtain a reconstructed image. The processing circuitry is further configured to generate a synthetic video based on the reconstructed image, the synthetic video including the target object, and an action of the target object being synchronized with the source audio.

An embodiment of this disclosure provides a system for synchronizing an action of a target object with source audio. The system includes a terminal and an information processing apparatus. The terminal includes processing circuitry that is configured to transmit an action synchronization request of the target object to the information processing apparatus, the action synchronization request including the source audio and a target video that includes the target object. The information processing apparatus is configured to perform any of the synchronization methods.

An embodiment of this disclosure provides a computer program product or a computer program, the computer program product or the computer program including a computer instruction, the computer instruction being stored in a computer-readable storage medium. A processor of a computer device reads the computer instruction from the computer-readable storage medium, and the processor is configured to execute the computer instruction to perform the action driving method of a target object above.

An embodiment of this disclosure provides an action driving device of a target object, including: a memory, configured to store an executable instruction; and a processor, configured to perform, when executing the executable instruction stored in the memory, the action driving method of a target object above.

An embodiment of this disclosure provides a non-transitory computer-readable storage medium, storing instructions which when executed by a processor cause the processor to perform any of the synchronization methods.

The embodiments of this disclosure may include the following beneficial effects: a synthetic video in which an audio drives an action of a target object is finally obtained through a combined parameter of a source parameter and a target parameter, which may improve the smoothness and reality of the finally obtained synthetic video, thereby improving a visual effect of video synthesis.

DESCRIPTION OF EMBODIMENTS

Figure 1:
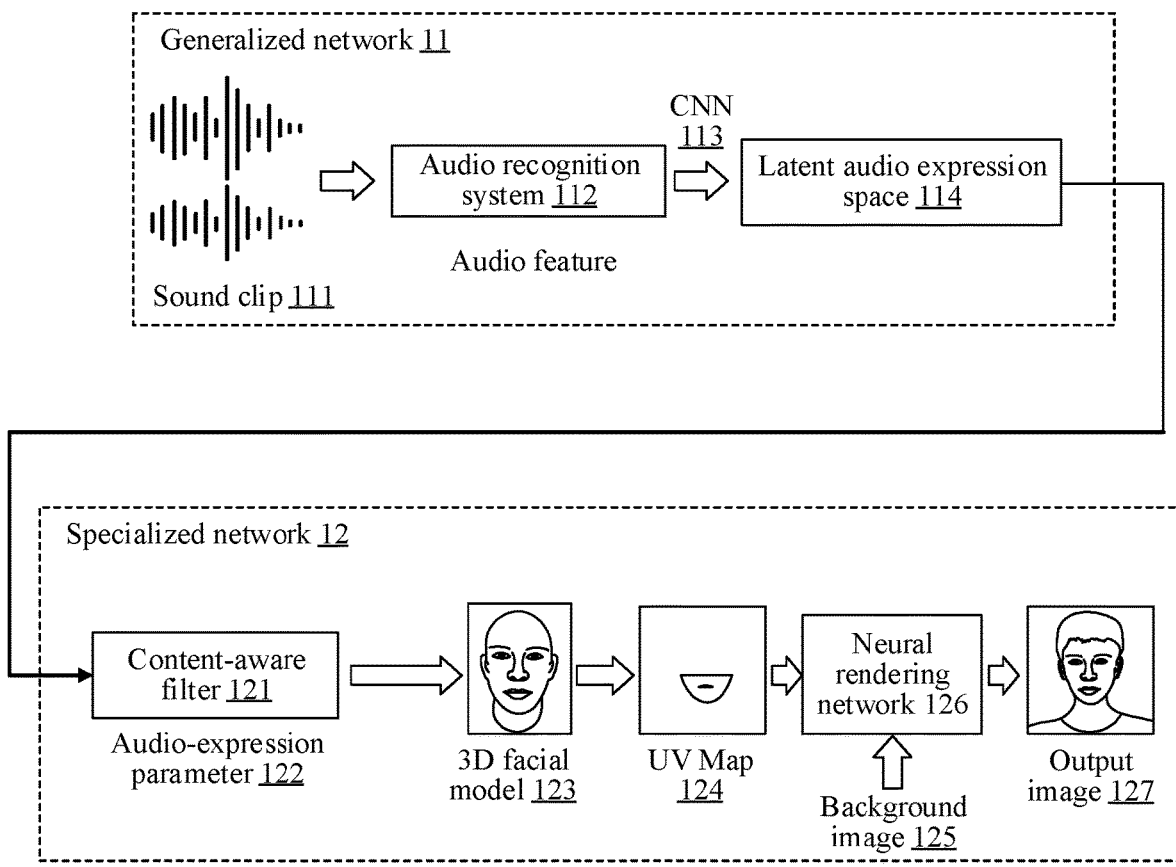
FIG. 1 is a systematic framework diagram of an action driving method of a target object in the related art.

To make objectives, technical solutions, and advantages of this disclosure clearer, the following describes this disclosure in further detail with reference to the accompanying drawings. The described embodiments are not to be considered as a limitation to this disclosure. Other embodiments are within the scope of this disclosure.

In the following descriptions, the term "some embodiments" describes subsets of all possible embodiments, but it may be understood that "some embodiments" may be the same subset or different subsets of all the possible embodiments, and can be combined with each other without conflict. Unless otherwise defined, meanings of all technical and scientific terms used in the embodiments of this disclosure are the same as those usually understood by a person skilled in the art to which the embodiments of this disclosure belongs. Terms used in the embodiments of this disclosure are merely intended to describe objectives of the embodiments of this disclosure, but are not intended to limit this disclosure.

Before the embodiments of this disclosure are explained, an action driving method of a target object in the related art is first described.

At present, a solution for generating a lip-sync speech video is mainly divided into: text driving and audio driving. As the name implies, the text driving is to input a piece of text and a video of a target character, convert the text into an audio through the text-to-speech (TTS) technology, learn a facial feature from an audio feature, and finally output a video in which the target character reads the inputted text; and the audio driving is to skip the step of TTS and directly input an audio and a video of a target character. That is, the text driving method is an extension of the audio driving method. At present, the solution for generating a lip-sync speech video is mainly performed based on deep learning. In the Audio2Obama method, 20 mouth key points are first learned from an audio feature by using a recurrent neural network, mouth texture is then generated based on information of the key points, and the mouth texture is finally combined with a target video frame, to obtain lip-sync speech video frames. The ObamaNet method based on text driving mainly includes three modules: a "text-speech" module, a "speech-key point" module, and a "key point-video frame" module. The "text-speech" module adopts Char2Wav in the TTS algorithm. The "speech-key point" module also learns information of key points from an audio feature by using a recurrent neural network. The "key point-video frame" module adopts the U-Net network with skip connection to implement information transmission. This method is an example of the first text-driving lip-sync speech video generating model based on deep learning.

Although the above methods can achieve considerable results, the above methods are all based on the same person for experimental verification, resulting in poor scalability of the model. Therefore, some other methods have also begun to work on designing networks that can adapt to voices of different characters. For example, in a method, a common and shared "audio-expression" space is first learned according to a plurality of sound clips from different sources, and 3D facial reconstruction is then performed according to an expression parameter obtained to obtain a corresponding facial coordinate map, that is, a UV map. The UV map is a map that maps from 3D facial coordinates to a 2D plane. This method also adopts the U-Net network to render video frames. Another method provides an audio identity information removal network to convert audio features of different speakers into a global domain, learns an expression parameter from an audio feature by using a recurrent neural network, combines the obtained expression parameter and a 3D facial parameter of a target character for reconstruction to obtain 3D mesh, and inputs the 3D mesh to the U-Net network to obtain final video frames. Still another method mainly improves a rendering module and provides a memory-enhanced generative adversarial network (GAN) to save pairs of identity feature and spatial feature of different speakers, so as to implement video synthesis of different speakers.

In the related art, an action driving method of a target object based on an audio driving model is further provided. In this method, a common and shared "audio-expression" space is first learned according to a plurality of sound clips from different sources, the space is formed by a plurality of blend shapes, and different expression parameters may be formed by a linear combination of different blend shapes in the space; 3D facial reconstruction is then performed according to an expression parameter obtained to obtain a corresponding UV map; and video frames are rendered by using dilated convolution-based U-Net. FIG. 1 is a systematic framework diagram of an action driving method of a target object in the related art. As shown in FIG. 1, the systematic framework of the action driving method of a target object is formed by a generalized network 11 and a specialized network 12. A specific processing procedure of the systematic framework of the technical solution is as follows. First, sound clips 111 from different sources are inputted into an audio recognition system (DeepSpeech RNN) 112 for audio feature extraction to obtain audio features. Then, the different audio features are mapped to a common and shared latent audio expression space 114 through a convolutional neural network (CNN) 113. The different audio features may be formed by linear combinations of different blend shapes in the space. An output of the generalized network 11 enters a content-aware filter 121 of the specialized network 12 to obtain a smooth audio-expression parameter 122 to further obtain a reconstructed 3D facial model 123 and a UV map 124. Finally, the UV map 124 and a background image 125 are inputted into a neural rendering network 126 to obtain a final output image 127.

The above method in the related art has at least the following problems. In the audio-driving method in the related art, giving a text to output a corresponding lip-sync speech video cannot be implemented. In the related art, the used facial parameter includes only a UV map obtained from a 3D facial model, but the UV map can provide only prior data of mouth for a network, and the network does not have any auxiliary information for the details of teeth. In the related art, when a rendering network is trained, only corresponding frames of a predicted value and a real value are penalized, and no consideration is given to previous and next frames of the input, which leads to the unoptimized difference of the previous and next frames, resulting in a shake effect of a final video. In addition, the video corresponding to the final lip-sync speech video frames generated by the above method in the related art may not appear to be smooth and may appear to be unnatural.

The current main challenges in the field of 3D virtual human lip-sync speech video generation include: face reconstruction and video frame rendering. For the first challenge, an embodiment of this disclosure provides a speech-to-facial parameter network, which can learn 2D mouth key points and 3D facial expression parameters from an audio feature. In this case, the precise position information provided by the 2D key points can be obtained, and the advantages of depth information of the 3D facial parameters can also be retained. Combining 2D and 3D parameters to reconstruct the face can ensure its accuracy. The reconstructed face is further fused with the background. For the second challenge, an embodiment of this disclosure provides a two-stage rendering network. The first rendering network is used to render a mouth texture region from a reconstructed face. The second rendering network is used to combine the mouth texture region and the background to render final video frames. Advantages of using the two-stage rendering network may include the following: (1) Training two rendering networks separately can reduce the difficulty of training and ensure the accuracy of the mouth texture generated by the first rendering network; and/or (2) When the second rendering network is trained, the mouth region is penalized again to correct the mouth and optimize the details of teeth and wrinkles. In addition, when the rendering network is trained, a video frame similarity loss is further used to ensure that there is little difference between the outputted previous and next frames, avoiding the problems that the video is shaking, not smooth, or unnatural.

An embodiment of this disclosure provides an action driving method of a target object. First, a source audio and a target video are acquired, the target video including the target object. Then, facial parameter conversion is performed on an audio parameter of the source audio at each moment to obtain a source parameter of the source audio at a corresponding moment; parameter extraction is performed on the target video to obtain a target parameter; and image reconstruction is performed on the target object in the target video according to a combined parameter obtained by combining the source parameter and the target parameter, to obtain a reconstructed image. Finally, a synthetic video is generated through the reconstructed image, the synthetic video including the target object, and an action of the target object being corresponding to the source audio. In this case, a synthetic video in which an audio drives an action of a target object is finally obtained based on a combined parameter of a source parameter and a target parameter, which improves the smoothness and reality of the finally obtained synthetic video, thereby improving a visual effect of video synthesis.

It is to be noted that, the face in the embodiments of this disclosure is not limited to a human face, and may be an animal face or a face of a virtual object.

The following describes an exemplary application of an action driving device of a target object according to an embodiment of this disclosure. In an implementation, the action driving device of a target object provided in this embodiment of this disclosure may be implemented as any terminal having a video playback function, such as a notebook computer, a tablet computer, a desktop computer, a mobile device (e.g., a mobile phone, a portable music player, a personal digital assistant, a dedicated message device, and a portable game device), and a smart robot. In another implementation, the action driving device of a target object provided in this embodiment of this disclosure may be implemented as a server. The following describes an exemplary application of an action driving device of a target object implemented as a server.

Figure 2:
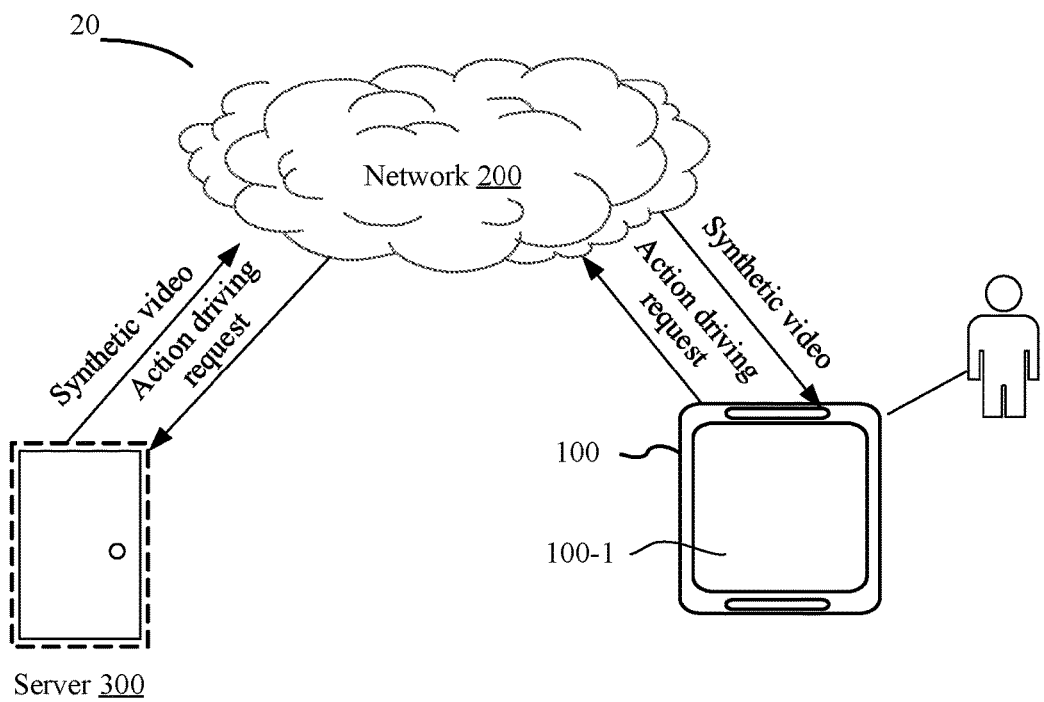
FIG. 2 is a schematic architectural diagram of an action driving system of a target object according to an embodiment of this disclosure.

Referring to FIG. 2, FIG. 2 is a schematic architectural diagram of an action driving system 20 of a target object according to an embodiment of this disclosure. In order to synthesize a synthetic video with both a target object and a source audio, that is, to generate a synthetic video in which a source audio drives an action of a target object, the action driving system 20 of a target object provided in this embodiment of this disclosure includes a terminal 100, a network 200, and a server 300. The terminal 100 acquires a target video and a source audio, generates an action driving request of the target object according to the target video and the source audio, and transmits the action driving request to the server 300 through the network 200. The server 300 performs, in response to the action driving request, facial parameter conversion on an audio parameter of the source audio at each moment to obtain a source parameter of the source audio at the corresponding moment; performs parameter extraction on the target video to obtain a target parameter; performs image reconstruction on the target object in the target video according to a combined parameter obtained by combining the source parameter and the target parameter, to obtain a reconstructed image; and generates a synthetic video through the reconstructed image, the synthetic video including the target object, and an action of the target object being corresponding to the source audio. After the synthetic video is obtained, the synthetic video is transmitted to the terminal 100 through the network 200. After the terminal 100 obtains the synthetic video, the synthetic video is played on a current interface 100-1 of the terminal 100.

The following describes an exemplary application of an action driving device of a target object implemented as a terminal.

In order to synthesize a synthetic video with both a target object and a source audio, that is, to generate a synthetic video in which a source audio drives an action of a target object, the terminal 100 acquires a target video and a source audio. The target video and the source audio may be a locally stored video and audio, or may be a video and audio recorded in real-time. The terminal performs facial parameter conversion on an audio parameter of the source audio at each moment to obtain a source parameter of the source audio at the corresponding moment; performs parameter extraction on the target video to obtain a target parameter; performs image reconstruction on the target object in the target video according to a combined parameter obtained by combining the source parameter and the target parameter, to obtain a reconstructed image; and generates a synthetic video through the reconstructed image, the synthetic video including the target object, and an action of the target object being corresponding to the source audio. After the synthetic video is obtained, the synthetic video is played on a current interface 100-1 of the terminal 100.

The action driving method of a target object provided in the embodiments of this disclosure also relates to the field of artificial intelligence (AI) technologies, in which a synthetic video may be obtained through AI technologies. The embodiments of this disclosure may be implemented through at least computer vision technology, speech technology, and nature language processing technology in AI technologies. Computer vision (CV) technology includes a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies usually include technologies such as image processing, image recognition, image semantic understanding, image retrieval, optical character recognition (OCR), video processing, video semantic understanding, video content/behavior recognition, three-dimensional object reconstruction, 3D technology, virtual reality, augmented reality, synchronous positioning, or map construction, and further include biological feature recognition technologies such as common face recognition and fingerprint recognition. Key technologies of the speech technology include automatic speech recognition (ASR) technology, text-to-speech (TTS) technology, and voiceprint recognition technology. To make a computer capable of listening, seeing, speaking, and feeling is the future development direction of human-computer interaction, and speech has become one of the most promising human-computer interaction methods in the future. Nature language processing (NLP) is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

The action driving method of a target object provided in the embodiments of this disclosure may also be implemented based on a cloud platform and through cloud technology. For example, the server 300 may be a cloud server.

Figure 3:
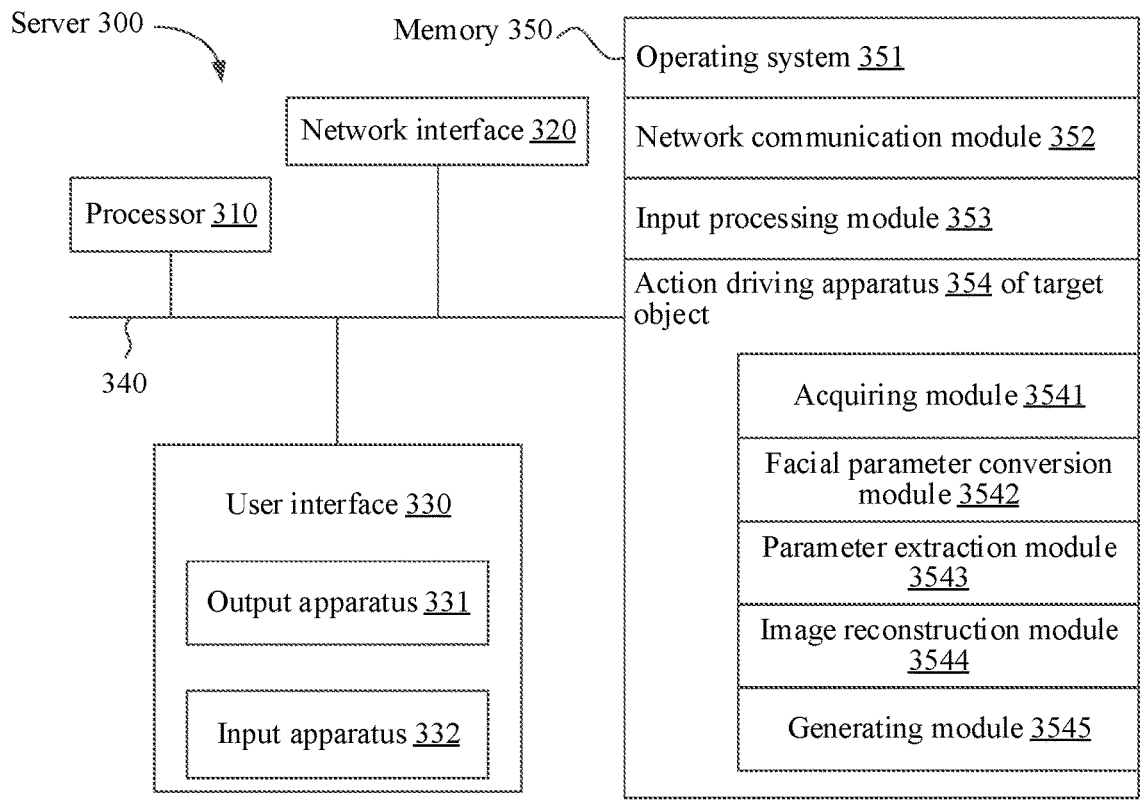
FIG. 3 is a schematic structural diagram of an action driving device of a target object according to an embodiment of this disclosure.

FIG. 3 is a schematic structural diagram of an action driving device of a target object according to an embodiment of this disclosure. For example, the action driving device of a target object is the server 300, and the server 300 in FIG. 3 includes: at least one processor 310, a memory 350, at least one network interface 320, and a user interface 330. Components in the server 300 are coupled together by using a bus system 340. It may be understood that the bus system 340 is configured to implement connection and communication between the components. In addition to a data bus, the bus system 340 further includes a power bus, a control bus, and a state signal bus. However, for ease of clear description, all types of buses are marked as the bus system 340 in FIG. 3.

The processor 310, is an example or processing circuitry, and may include an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 330 includes one or more output apparatuses 331 that can display media content, including one or more speakers and/or one or more visual display screens. The user interface 330 further includes one or more input apparatuses 332, including user interface components that facilitate the input of a user, such as a keyboard, a mouse, a microphone, a touch display screen, a camera, and other input button and control.

The memory 350 may be a removable memory, a non-removable memory, or a combination thereof. Exemplary hardware devices include a solid-state memory, a hard disk drive, an optical disc driver, or the like. The memory 350 may include one or more storage devices that are physically away from the processor 310. The memory 350 includes a volatile memory or a non-volatile memory, or may include both a volatile memory and a non-volatile memory. The non-volatile memory may be a read-only memory (ROM). The volatile memory may be a random access memory (RAM). The memory 350 described in the embodiments of this disclosure is to include any suitable type of memories. In some embodiments, the memory 350 can store data to support various operations. Examples of the data include program, module, and data structures, or a subset or superset thereof, which are described below by using examples.

An operating system 351 includes a system program configured to process various basic system services and perform a hardware-related task, such as a framework layer, a core library layer, or a driver layer, and is configured to implement various basic services and process a hardware-based task.

A network communication module 352 is configured to reach another computing device through one or more (wired or wireless) network interfaces 320. Exemplary network interfaces 320 include: Bluetooth, wireless compatible authentication (Wi-Fi), a universal serial bus (USB), and the like.

An input processing module 353 is configured to detect one or more user inputs or interactions from one of the one or more input apparatuses 332 and translate the detected input or interaction.

In some embodiments, the apparatus provided in the embodiments of this disclosure may be implemented by using software. FIG. 3 shows an action driving apparatus 354 of a target object stored in the memory 350. The action driving apparatus 354 of a target object may be an action driving apparatus of a target object in the server 300 and may be software in a form such as a program and a plug-in, including the following software modules: an acquiring module 3541, a facial parameter conversion module 3542, a parameter extraction module 3543, an image reconstruction module 3544, and a generating module 3545. These modules are logical modules, and thus may be randomly combined or further divided based on a function to be implemented. The following describes functions of the modules.

In some other embodiments, the apparatus provided in the embodiments of this disclosure may be implemented by using hardware. For example, the apparatus provided in the embodiments of this disclosure may be a processor in a form of a hardware decoding processor, programmed to perform the action driving method of a target object provided in the embodiments of this disclosure. For example, the processor in the form of processing circuitry such as a hardware decoding processor may use one or more application specific integrated circuits (ASIC), a DSP, a programmable logic device (PLD), a complex programmable logic device (CPLD), a field-programmable gate array (FPGA), or other electronic components.

Figure 4:
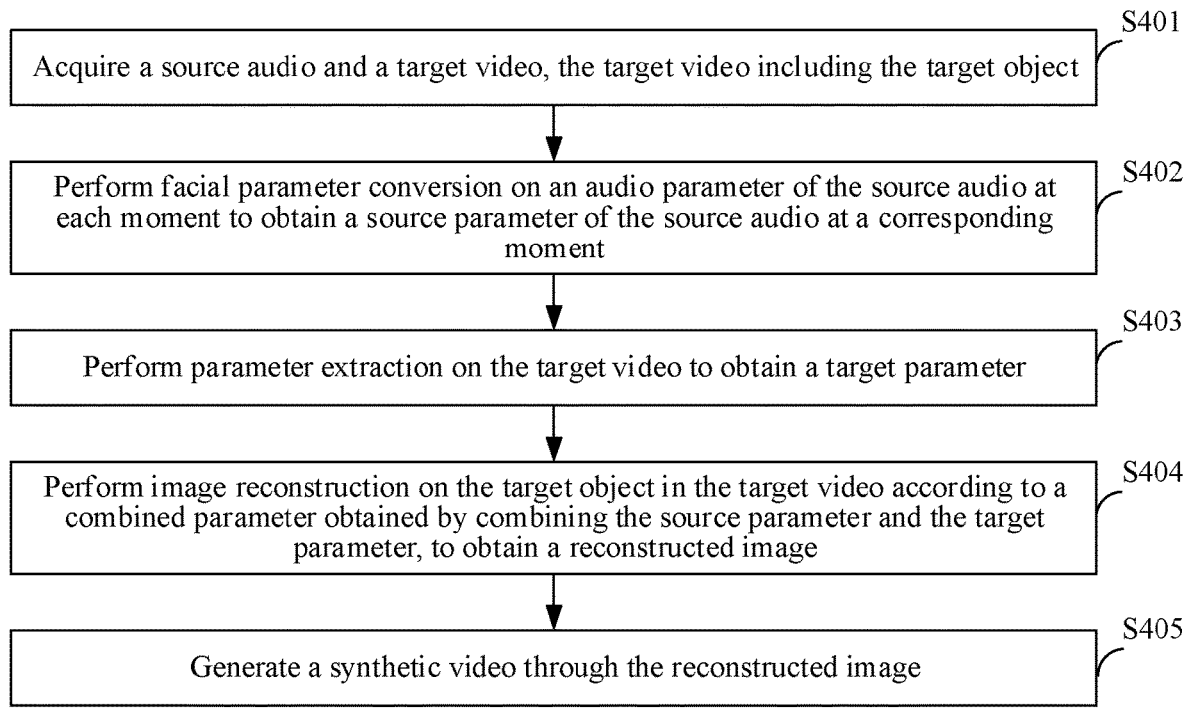
FIG. 4 is a schematic flowchart of an action driving method of a target object according to an embodiment of this disclosure.

The action driving method of a target object provided in the embodiments of this disclosure is described with reference to an exemplary application and implementation of the server 300 provided in the embodiments of this disclosure. The method may be a video synthesis method. Referring to FIG. 4, FIG. 4 is a schematic flowchart of an action driving method of a target object according to an embodiment of this disclosure. The steps shown in FIG. 4 are described below.

In step S401, a source audio and a target video may be acquired. The target video includes the target object.

The server may receive an action driving request of the target object transmitted by a user through a terminal. The action driving request is used to request synthesis of the source audio and the target video to generate a synthetic video that includes both the target object and the source audio and in which the source audio drives an action of the target object. That is, the synthetic video generated based on the request has the target object in the target video, and an audio corresponding to the target object is the source audio.

The source audio may be an audio pre-recorded by a user, or may be an audio downloaded from a network, or may be an audio obtained by converting a specific text. In some embodiments, a sound feature of the source audio may be a sound feature of a specific object or may be a sound feature of the target object in the target video.

In step S402, facial parameter conversion may be performed on an audio parameter of the source audio at each moment to obtain a source parameter of the source audio at a corresponding moment. In an example, facial parameter conversion is performed on an audio parameter of the source audio at different time periods to obtain source parameter information of the source audio at the respective time periods.

The source parameter at each moment may include, but is not limited to, an expression parameter and a mouth key point parameter. The expression parameter is an expression parameter corresponding to the audio parameter at the moment. For example, when the audio parameter corresponds to a cheerful audio, the expression parameter may be a smile expression parameter. When the audio parameter corresponds to a sad audio, the expression parameter may be a frowning expression parameter. The mouth key point parameter is a mouth shape parameter when expressing the audio parameter at the moment.

In this embodiment of this disclosure, the expression parameter is a 3D expression parameter, and the mouth key point parameter is a 2D key point parameter.

In step S403, parameter extraction may be performed on the target video to obtain a target parameter. In an example, parameter extraction is performed on a target video that includes the target object to obtain target parameter information of the target video.

The parameter extraction may be performed on the target video by using a preset algorithm, that is, the parameter extraction is performed on the target object in the target video. The target parameter may include, but is not limited to, a target mouth key point parameter and a target facial parameter. In some embodiments, the target parameter may also include a posture parameter, a position parameter, a shape parameter, an action parameter, and/or the like of the target object.

In step S404, image reconstruction may be performed on the target object in the target video according to a combined parameter obtained by combining the source parameter and the target parameter, to obtain a reconstructed image. In an example, image reconstruction is performed on the target object in the target video based on the source parameter information of the source audio and the target parameter information of the target video, to obtain a reconstructed image.

First, the source parameter and the target parameter may be combined to obtain the combined parameter. The combined parameter may be used to characterize a posture, a position, a shape, an action, and a mouth shape of the target object in a final synthetic video.

In this embodiment of this disclosure, image reconstruction is performed on the target object according to the combined parameter to obtain the reconstructed image. The reconstructed image is used to generate a final synthetic video.

In step S405, a synthetic video may be generated through the reconstructed image.

The synthetic video includes the target object, and an action of the target object corresponds to the source audio. In an example, a synthetic video is generated based on the reconstructed image, the synthetic video including the target object, and the action of the target object being synchronized with the source audio.

In this embodiment of this disclosure, corresponding to the audio parameter at each moment, a corresponding reconstructed image is generated, and each reconstructed image is rendered to generate a synthetic image. The audio parameter has a certain duration, so there may be at least one reconstructed image, and a duration of the synthetic video is equal to or greater than a duration of the source audio. When there is one reconstructed image, a finally generated synthetic video is one synthetic image. When there are multiple reconstructed images, a duration of a finally generated synthetic video is equal to a duration of the source audio, and the synthetic video is a video formed by connecting multiple synthetic images in chronological order.

In some embodiments, the target video may have at least one video frame, and the target video has the target object. When the target video includes one video frame, the video frame has the target object. A video synthesis request is used to request the generation of the synthetic video having the target object, and the synthetic video is a dynamic video obtained based on one video frame. When the target video includes multiple video frames, at least one video frame has the target object. A video synthesis request is used to request the generation of the synthetic video having the target object, and the synthetic video is a dynamic video obtained based on multiple video frames.

In some embodiments, when the target video includes multiple video frames, a duration of the target video may be equal to or not equal to a duration of the source audio. When a duration of the target video is equal to a duration of the source audio, a synthetic image may be formed according to the audio parameter of the source audio corresponding to each video frame at each moment to finally form a synthetic video with a duration that is equal to the duration of the target video.

This embodiment of this disclosure may be applied to the following scenario. In the education industry, if a teaching video about a certain knowledge point is required, a source audio (e.g., an audio of a classroom teacher) corresponding to the knowledge point and a target video with a lecture of the teacher may be inputted into a server, and the server may directly generate a teaching video (e.g., a synthetic video) in which the teacher explains the knowledge point by using the method in this embodiment of this disclosure and output the synthetic video.

In the action driving method of a target object provided in this embodiment of this disclosure, facial parameter conversion is performed on an audio parameter of a source audio at each moment to obtain a source parameter of the source audio at the corresponding moment, parameter extraction is performed on a target video to obtain a target parameter, image reconstruction is performed on the target object according to a combined parameter of the source parameter and the target parameter to obtain a reconstructed image, and finally a synthetic video is generated through the reconstructed image. The synthetic video includes the target object, and an action of the target object corresponds to the source audio. In this case, a synthetic video in which an audio drives an action of a target object is finally obtained based on a combined parameter of a source parameter and a target parameter, which improves the smoothness and reality of the finally obtained synthetic video, thereby improving a visual effect of video synthesis.

Figure 5:
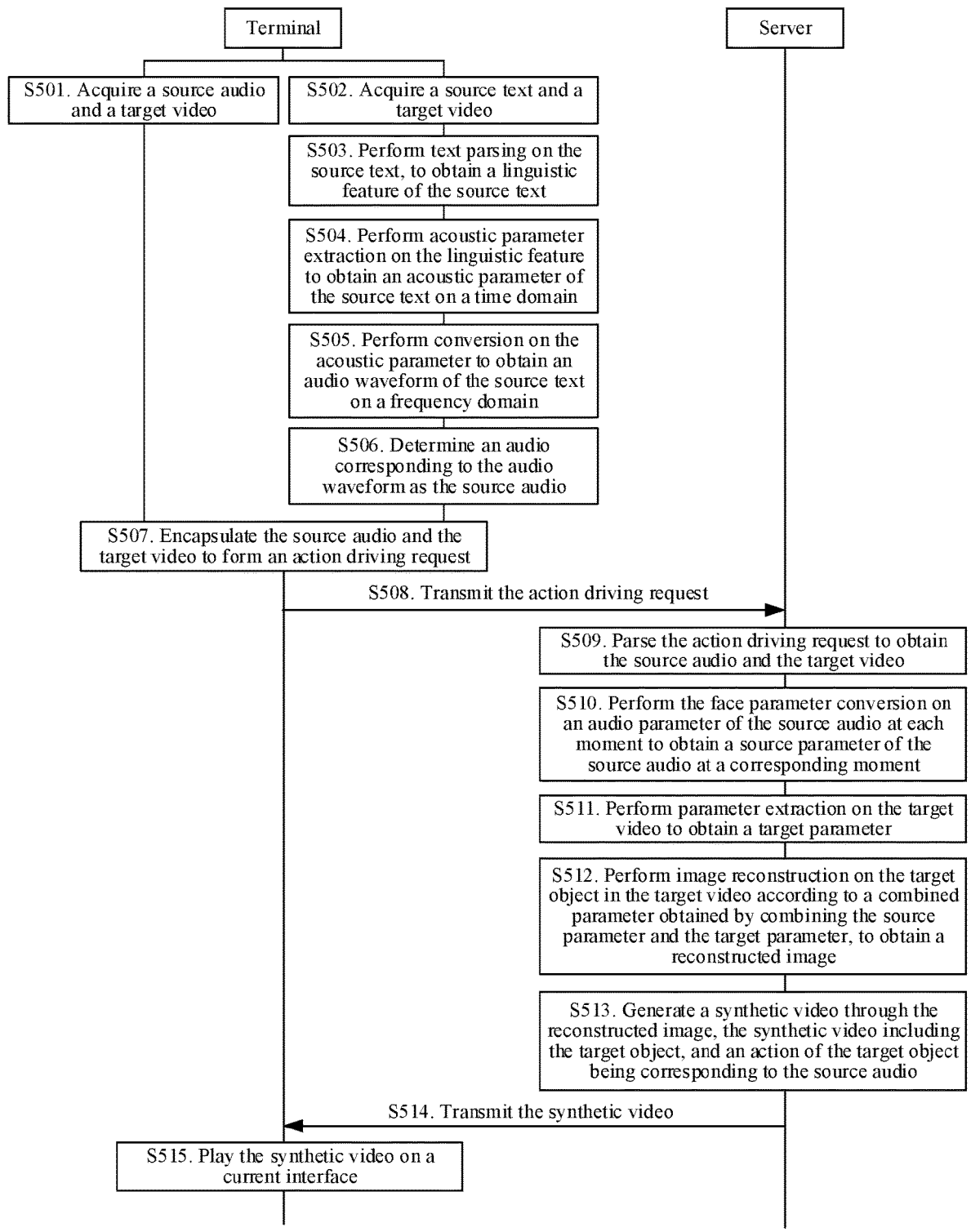
FIG. 5 is a schematic flowchart of an action driving method of a target object according to an embodiment of this disclosure.

In some embodiments, an action driving system of a target object includes at least a terminal and a server. Through the interaction between the terminal and the server, the response to an action driving request of the terminal is implemented to generate a synthetic video required by a user. The action driving request includes a source audio and a target video. The action driving request may also include a source text, and a source audio may be obtained through the source text. FIG. 5 is a schematic flowchart of an action driving method of a target object according to an embodiment of this disclosure. As shown in FIG. 5, the method may include the following steps.

In step S501, a terminal may acquire a source audio and a target video.

The source audio may be an audio collected by a user through an audio collection apparatus on the terminal or may be an audio downloaded by a user through the terminal. The target video may be a video with any duration, and the target video includes the target object.

In step S502, the terminal may acquire a source text and a target video.

The source text is a text used for generating the source audio. In this embodiment of this disclosure, the inputted source audio may be processed to generate a synthetic video with the source audio, and the inputted source text may also be parsed and converted to generate the source audio, so as to form a synthetic video with the source audio.

In step S503, the terminal may perform text parsing on the source text, to obtain a linguistic feature of the source text.

The linguistic feature may include, but is not limited to: pinyin, pause, punctuation, tone, and the like. In some embodiments, text parsing may be performed on the source text based on AI technology to obtain the linguistic feature of the source text.

In step S504, the terminal may perform acoustic parameter extraction on the linguistic feature to obtain an acoustic parameter of the source text on or in a time domain.

The acoustic parameter is parametric representation of the source text on the time domain. The acoustic parameter extraction is performed on the linguistic feature to obtain the acoustic parameter of the source text on the time domain.

In step S505, the terminal may perform conversion on the acoustic parameter to obtain an audio waveform of the source text on or in a frequency domain.

The audio waveform may be an acoustic representation corresponding to the acoustic parameter, and the audio waveform may be a parametric representation of the source text on or in the frequency domain.

In step S506, the terminal may determine an audio corresponding to the audio waveform as the source audio.

In step S507, the terminal may encapsulate the source audio and the target video to form an action driving request.

In some embodiments, the terminal may encapsulate the source text into the action driving request and transmit the action driving request to a server, and the server performs converting the source text into the source audio in step S503 to step S506.

In step S508, the terminal may transmit the action driving request to a server.

In step S509, the server may parse the action driving request to obtain the source audio and the target video.

In step S510, the server may perform facial parameter conversion on an audio parameter of the source audio at each moment to obtain a source parameter of the source audio at a corresponding moment.

In step S511, the server may perform parameter extraction on the target video to obtain a target parameter.

In step S512, the server may perform image reconstruction on the target object in the target video according to a combined parameter obtained by combining the source parameter and the target parameter, to obtain a reconstructed image.

In step S513, the server may generate a synthetic video through the reconstructed image, the synthetic video including the target object, and an action of the target object being corresponding to the source audio.

It is to be noted that, step S510 to step S513 may be the same as step S402 to step S405. Detailed examples are not repeated in this embodiment of this disclosure.

In step S514, the server may transmit the synthetic video to the terminal.

In step S515, the terminal may play the synthetic video on a current interface.

Figure 6A:
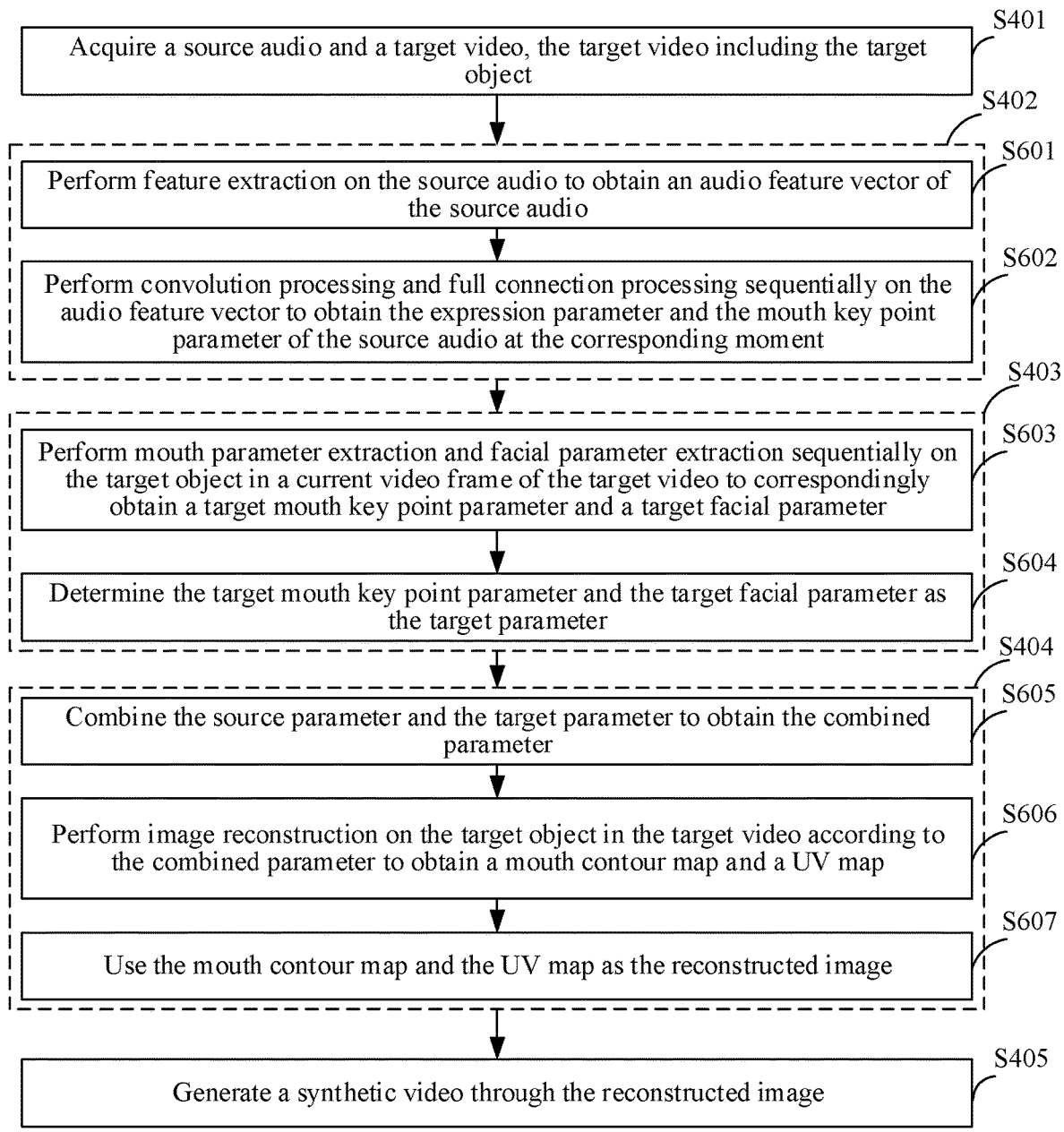
FIG. 6A and FIG. 6B are a schematic flowchart of an action driving method of a target object according to an embodiment of this disclosure.

In some embodiments, the source parameter includes: an expression parameter and a mouth key point parameter. Based on FIG. 4, FIG. 6A is a schematic flowchart of an action driving method of a target object according to an embodiment of this disclosure. As shown in FIG. 6A, step S402 may be implemented through the following steps.

In step S601, feature extraction may be performed on the source audio to obtain an audio feature vector of the source audio.

In step S602, convolution processing and full connection processing may be performed sequentially on the audio feature vector to obtain the expression parameter and the mouth key point parameter of the source audio at the corresponding moment.

In some embodiments, step S602 may be implemented in the following manner: performing the convolution processing on the audio feature vector sequentially through at least two first convolution layers with a specific convolution kernel to obtain a convolution processing vector; and performing the full connection processing on the convolution processing vector sequentially through at least two full connection layers to obtain a full connection processing vector.

The full connection processing vector includes a vector corresponding to the expression parameter and a vector corresponding to the mouth key point parameter. A sum of dimensions of the vector corresponding to the expression parameter and the vector corresponding to the mouth key point parameter is equal to a dimension of the full connection processing vector.

Still referring to FIG. 6A, in some embodiments, step S403 may be implemented through the following steps:

In step S603, mouth parameter extraction and facial parameter extraction may be performed sequentially on the target object in a current video frame of the target video to correspondingly obtain a target mouth key point parameter and a target facial parameter.

The target mouth key point parameter and the target facial parameter are parameters of the target object. When the target video includes multiple video frames, the target mouth key point parameter and the target facial parameter of the target object may be extracted from each video frame.

In step S604, the target mouth key point parameter and the target facial parameter may be determined as the target parameter. In an example, the target mouth key point parameter and the target facial parameter are included in target parameter information.

Still referring to FIG. 6A, in some embodiments, step S404 may be implemented through the following steps.

In step S605, the source parameter and the target parameter may be combined to obtain the combined parameter.

Combining the source parameter and the target parameter may include extracting parameters that are used for generating a final synthetic image and deleting parameters that are not used for generating the final synthetic image, to obtain the combined parameter.

In step S606, image reconstruction may be performed on the target object in the target video according to the combined parameter to obtain a mouth contour map and a UV map.

In this embodiment of this disclosure, the reconstructed image includes a mouth contour map and a UV map. The mouth contour map is used to reflect a mouth contour of the target object in a final generated synthetic image. The UV map may be combined with the mouth contour map to generate a mouth region texture of the target object in a synthetic image.

In step S607, the mouth contour map and the UV map may be used as the reconstructed image.

In this embodiment of this disclosure, the source parameter includes: an expression parameter and a mouth key point parameter; the target parameter includes a target mouth key point parameter and a target facial parameter; and the target facial parameter includes at least: a target posture parameter, a target shape parameter, and a target expression parameter.

In some embodiments, step S605 may be implemented in the following manner: replacing the target expression parameter in the target facial parameter through the expression parameter to obtain a replaced facial parameter; replacing the target mouth key point parameter through the mouth key point parameter to obtain a replaced mouth key point parameter; and using the replaced facial parameter and the replaced mouth key point parameter as the combined parameter.

Figure 6B:
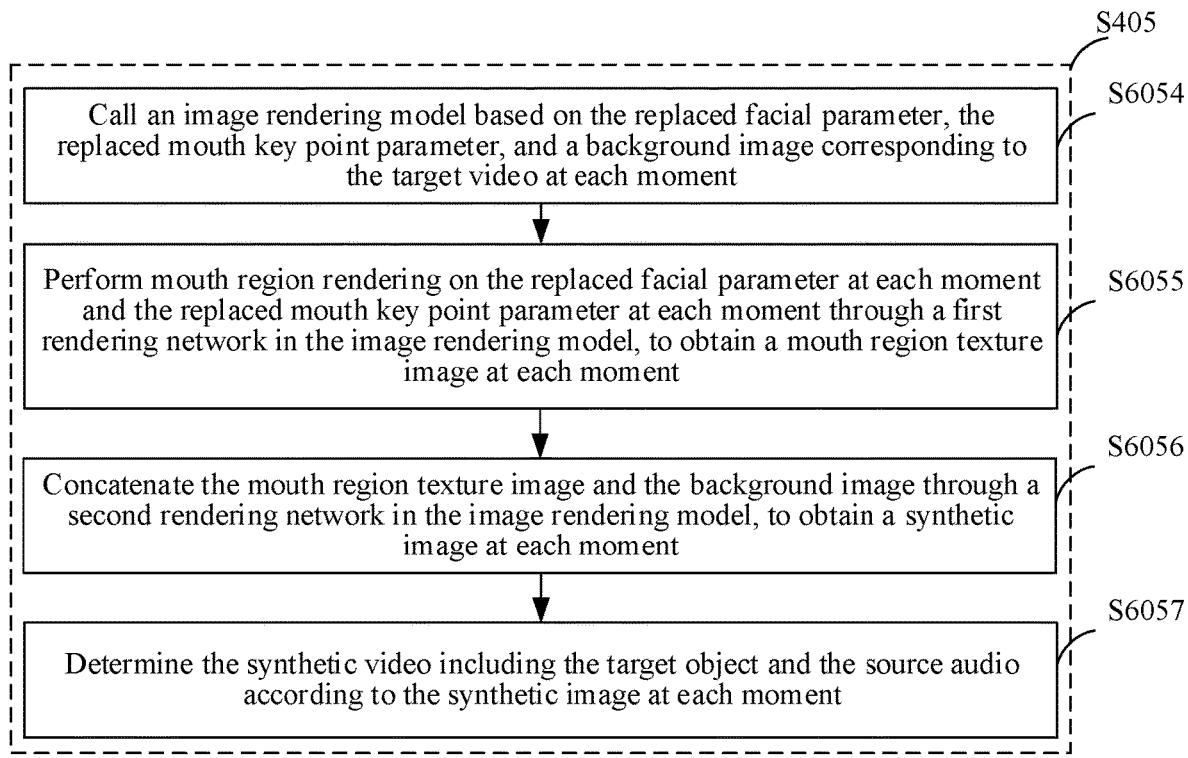

Referring to FIG. 6B, the process of generating a synthetic video through the reconstructed image in step S405 may be implemented through the following steps:

In step S6054, an image rendering model may be called based on the replaced facial parameter, the replaced mouth key point parameter, and a background image corresponding to the target video at each moment.

The replaced facial parameter, the replaced mouth key point parameter, and the background image corresponding to the target video at each moment are inputted into the image rendering model. The reconstructed image includes the replaced facial parameter and the replaced mouth key point parameter.

In step S6055, mouth region rendering may be performed on the replaced facial parameter at each moment and the replaced mouth key point parameter at each moment through a first rendering network in the image rendering model, to obtain a mouth region texture image at each moment.

In some embodiments, the first rendering network includes at least one second convolution layer, at least one first downsampling layer, and at least one first upsampling layer. The process of mouth region rendering may be implemented through the following steps: performing convolution processing and downsampling processing on the replaced facial parameter and the replaced mouth key point parameter sequentially through the second convolution layer and the first downsampling layer, to obtain a depth feature of the reconstructed image; and performing upsampling processing on the depth feature of the reconstructed image through the first upsampling layer, to restore a resolution of the reconstructed image and obtain the mouth region texture image.

In step S6056, the mouth region texture image and the background image may be concatenated through a second rendering network in the image rendering model, to obtain a synthetic image at each moment.

In some embodiments, the second rendering network includes at least one third convolution layer, at least one second downsampling layer, and at least one second upsampling layer. The process of concatenating may be implemented through the following steps: performing convolution processing and downsampling processing on the mouth region texture image and the background image sequentially through the third convolution layer and the second downsampling layer, to obtain depth features of the mouth region texture image and the background image; and performing upsampling processing on the depth features of the mouth region texture image and the background image through the second upsampling layer, to restore resolutions of the mouth region texture image and the background image, and to obtain the synthetic image at a current moment.

In step S6057, the synthetic video including the target object and the source audio may be determined according to the synthetic image at each moment.

In some embodiments, the image rendering model is used to render the reconstructed image at each moment to generate the synthetic image at the corresponding moment. The synthetic image includes not only the target object but also the audio of the source audio at the corresponding moment. The image rendering model includes at least a first rendering network and a second rendering network. The first rendering network is used to perform feature extraction and mouth region rendering on the reconstructed image and the target image respectively. The second rendering network is used to concatenate the mouth region texture image and the target image. The following describes a method for training an image rendering model according to an embodiment of this disclosure.

Figure 7:
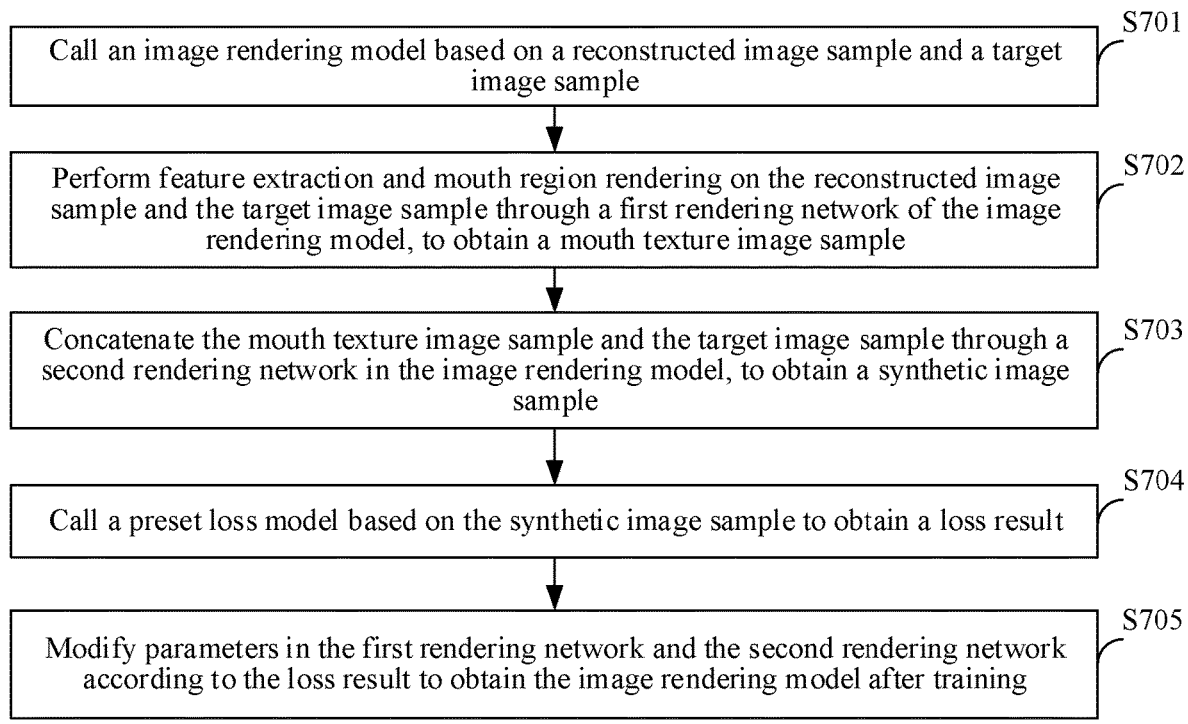
FIG. 7 is a schematic flowchart of a method for training an image rendering model according to an embodiment of this disclosure.

FIG. 7 is a schematic flowchart of a method for training an image rendering model according to an embodiment of this disclosure. As shown in FIG. 7, the method may include the following steps.

In step S701, an image rendering model may be called based on a reconstructed image sample and a target image sample.

In some embodiments, the reconstructed image sample may be obtained through the following steps: performing facial parameter conversion on an audio parameter of an audio sample at a current moment to obtain an audio parameter sample; performing parameter extraction on the target image sample to obtain a target parameter sample; and combining the audio parameter sample and the target parameter sample to obtain a combined parameter sample and performing image reconstruction on a target object in the target image sample according to the combined parameter sample, to obtain the reconstructed image sample.

In some embodiments, the reconstructed image sample may alternatively be obtained through the following steps: performing text parsing on a text sample to obtain a linguistic feature of the text sample and performing acoustic parameter extraction on the linguistic feature of the text sample, to obtain an acoustic parameter of the text sample on a time domain; performing conversion on the acoustic parameter to obtain an audio waveform of the text sample on a frequency domain and determining an audio corresponding to the audio waveform as an audio sample; performing facial parameter conversion on an audio parameter of the audio sample at a current moment to obtain an audio parameter sample; performing parameter extraction on the target image sample to obtain a target parameter sample; and combining the audio parameter sample and the target parameter sample to obtain a combined parameter sample and performing image reconstruction on a target object in the target image sample according to the combined parameter sample, to obtain the reconstructed image sample.

The target image sample includes a target object sample, and a finally generated synthetic image sample also includes the target object sample.

In step S702, feature extraction and mouth region rendering are performed on the reconstructed image sample and the target image sample through a first rendering network of the image rendering model, to obtain a mouth texture image sample.

The first rendering network includes at least one second convolution layer, at least one first downsampling layer, and at least one first upsampling layer.

When feature extraction is performed, convolution processing may be performed on parameters corresponding to the inputted reconstructed image sample and target image sample through the second convolution layer, and downsampling processing may be performed on the parameters after convolution processing through the first downsampling layer, to extract depth features of the reconstructed image sample and the target image sample, that is, to extract a first image feature sample. When mouth region rendering is performed, upsampling processing may be performed on the extracted first image feature sample through the first upsampling layer to restore resolutions of the reconstructed image sample and the target image sample and obtain the mouth texture image sample.

In this embodiment of this disclosure, a second convolution layer is connected before each first downsampling layer, and a second convolution layer is also connected after each first upsampling layer, that is, convolution processing is performed once before each downsampling processing, and convolution processing is performed once after each upsampling processing. In some embodiments, a skip connection is introduced between the first downsampling layer and the first upsampling layer to retain feature information of different resolutions through the skip connection.

In step S703, the mouth texture image sample and the target image sample may be concatenated through a second rendering network in the image rendering model, to obtain a synthetic image sample.

The second rendering network includes at least one third convolution layer, at least one second downsampling layer, and at least one second upsampling layer.

When concatenation is performed, convolution processing may be first performed on parameters corresponding to the inputted mouth texture image sample and target image sample through the third convolution layer, and downsampling processing may be performed on the parameters after convolution processing through the second downsampling layer, to extract depth features of the mouth texture image sample and the target image sample, that is, to extract a second image feature sample. Then, upsampling processing is performed on the extracted second image feature sample through the second upsampling layer to restore resolutions of the mouth texture image sample and the target image sample and obtain the synthetic image sample.

In this embodiment of this disclosure, a third convolution layer is connected before each second downsampling layer, and a third convolution layer is also connected after each second upsampling layer, that is, convolution processing is performed once before each downsampling processing, and convolution processing is performed once after each upsampling processing. In some embodiments, a skip connection may be introduced between the second downsampling layer and the second upsampling layer to retain feature information of different resolutions through the skip connection.

In step S704, a preset loss model may be called based on the synthetic image sample to obtain a loss result.

In some embodiments, step S704 may be implemented in the following manner: acquiring a real synthetic image corresponding to the reconstructed image sample and the target image sample; and concatenating the synthetic image sample and the real synthetic image, inputting the concatenated image into the preset loss model, and calculating a previous-next frame similarity loss for the synthetic image sample and the real synthetic image through the preset loss model, to obtain the loss result.

In this embodiment of this disclosure, when the previous-next frame similarity loss is calculated, the following loss functions may be calculated: a loss between two losses of the real synthetic image and the synthetic image sample with respect to the image rendering model, a generative adversarial loss, an L1 loss, a difference of feature maps outputted by the real synthetic image and the synthetic image sample in N activation layers calculated by using the L1 loss, a final loss obtained by performing linear weighting on the difference, and a previous-next frame similarity loss. The loss result is obtained by calculating at least one of the above loss functions. That is, the loss result may be obtained by performing weighted summation on the loss between two losses of the real synthetic image and the synthetic image sample with respect to the image rendering model, the generative adversarial loss, the L1 loss, the difference of feature maps outputted by the real synthetic image and the synthetic image sample in N activation layers calculated by using the L1 loss, the final loss obtained by performing linear weighting on the difference, and the previous-next frame similarity loss.

In step S705, parameters in the first rendering network and the second rendering network may be modified according to the loss result to obtain the image rendering model after training.

In this embodiment of this disclosure, when the image rendering model is trained, the model may be trained based on a similarity between previous and next frames by using a generative adversarial policy, and then a loss result of the image rendering model at each prediction is calculated. In this case, the image rendering model can be accurately trained, and the image rendering model obtained by training considers the continuous change between previous and next frames, so that the change between two consecutive video frames in the generated synthetic video is smoother, and thus the obtained synthetic video is smoother and more realistic, thereby improving a visual effect of the synthetic video generated by the image rendering model.

The following describes an exemplary application of this embodiment of this disclosure in an actual application scenario.

This embodiment of this disclosure may be applied to lip-sync speech video generation scenarios such as a smart speaker screen, a smart TV, AI education, and virtual streamer and streaming. Through the action driving method of a target object provided in the embodiments of this disclosure, a sync speech video corresponding to a specific target character may be synthesized according to inputted text and audio, which can significantly improve the human-computer interaction effect and user experience of smart products.

For example, for AI education applications, a target object may be a virtual teacher. Through the action driving method of a target object provided in the embodiments of this disclosure, according to a text or audio inputted by a teacher side, a sync-speech personalized 3D virtual teaching video is automatically generated to give lessons to a student side and simulate the function of online teaching of a real teacher, which improves the user experience on the student side and reduces the workload on the teacher side.

For example, for streaming applications, a target object may be a virtual streamer. Through the action driving method of a target object provided in the embodiments of this disclosure, according to a text or audio inputted by a streamer, a sync-speech virtual streaming video is automatically generated. The virtual streamer can broadcast a game live to attract attention, enhance interaction through chat programs, and obtain high clicks through cover dance, thereby improving the efficiency of streaming.

The following specifically describes an exemplary action driving method of a target object provided by the embodiments of this disclosure.

The action driving method of a target object provided by the embodiments of this disclosure is a text-driving or audio-driving 3D virtual human lip-sync speech video generation technique, which predicts a mouth shape by combining 2D and 3D facial parameters and then synthesizes a final output image using a rendering network trained based on a video frame difference loss. The embodiments of this disclosure can resolve the problems that an audio driving model is limited to an audio input only, and a synthetic video is unnatural and shaking.

In an embodiment of this disclosure, 2D/3D parameters may be learned by using a piece of text or audio, and thus a realistic lip-sync speech video of a specific target character is synthesized. During the implementation, an inputted text is first converted into a corresponding audio by using the TTS technology, 2D/3D facial parameters are then learned from an audio feature by using a convolutional neural network, 2D/3D facial parameters are also extracted from a video of a target character, the parameters of the target character are replaced with the learned parameters to reconstruct a new 2D/3D facial model, and the reconstructed facial model (e.g., a reconstructed image) is inputted into a rendering network to generate a video frame, thereby generating a lip-sync speech video of the target character.

Figure 8:
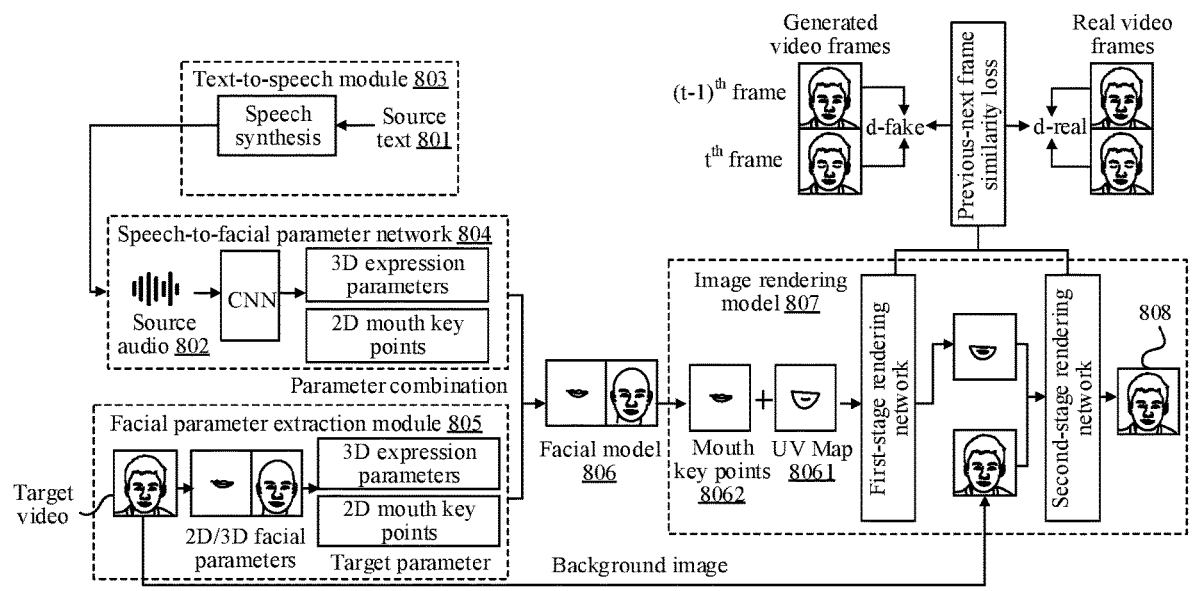
FIG. 8 is a systematic framework diagram of an action driving method of a target object according to an embodiment of this disclosure.

FIG. 8 is a systematic framework diagram of an action driving method of a target object according to an embodiment of this disclosure. As shown in FIG. 8, the system may input a source text 801 or a source audio 802. If the input is the source text 801, a corresponding source audio is generated through a text-to-speech module 803, and then a corresponding facial parameter is obtained from the source audio through a speech-to-facial parameter network 804. The facial parameter includes 2D mouth key points and 3D expression parameters. The obtained facial parameter and a target parameter acquired by a facial parameter extraction module 805 are combined to reconstruct a new facial model 806. A UV map 8061 and reconstructed mouth key points 8062 may be obtained by the facial model 806. The UV map 8061 and the reconstructed mouth key points 8062 are then inputted into a two-stage image rendering model 807 trained based on a previous-next frame similarity loss to generate a final output image (e.g., a synthetic image) 808.

Examples of each part of the systematic framework of the action driving method of a target object is described in detail below.

The text-to-speech module 803 is configured to convert a given input source text into a corresponding source audio as an input of the speech-to-facial parameter network.

Figure 9:
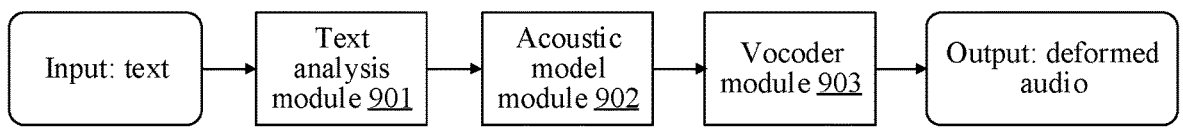
FIG. 9 is a block diagram of a text-to-speech module according to an embodiment of this disclosure.

FIG. 9 is a block diagram of a text-to-speech module according to an embodiment of this disclosure. As shown in FIG. 9, the text-to-speech module may include three sub-modules: a text analysis module 901, an acoustic model module 902, and a vocoder module 903. The text analysis module 901 is configured to parse an inputted text (e.g., a source text) to determine pronunciation, tone, intonation, and the like of each word, and map the text to a linguistic feature. The linguistic feature includes, but is not limited to: pinyin, pause, punctuation, tone, and the like. The acoustic model module 902 is configured to map the linguistic feature to an acoustic parameter. The acoustic parameter is parametric representation of the source text on a time domain. The vocoder module 903 is configured to convert the acoustic parameter to an audio waveform. The audio waveform is parametric representation of the source text on a frequency domain.

Figure 10:
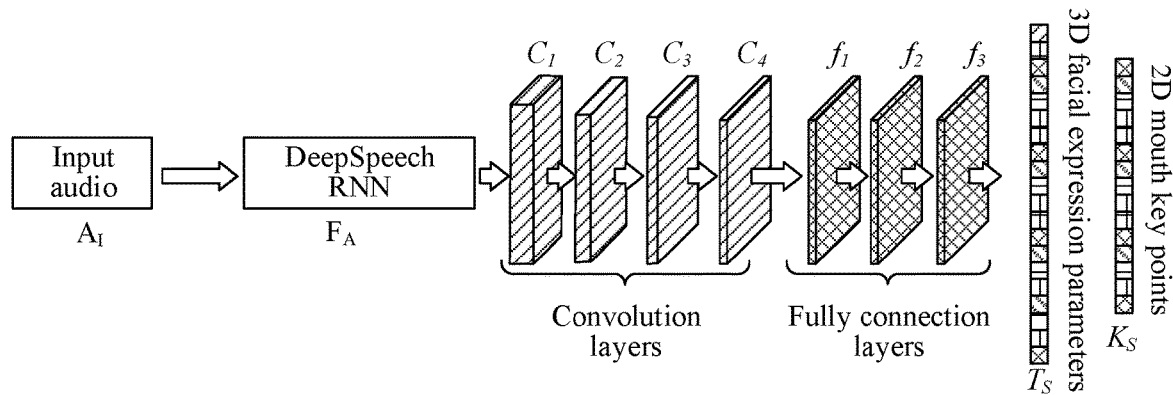
FIG. 10 is a block diagram of a speech-to-facial parameter network according to an embodiment of this disclosure.

FIG. 10 is an exemplary block diagram of a speech-to-facial parameter network, such as the speech-to-facial parameter network 804, according to an embodiment of this disclosure. As shown in FIG. 10, $A_I$ represents an input audio (e.g., a source audio) obtained through a speech of a user or the text-to-speech module, $F_A$ represents audio features, $c_1$-$c_4$ represent four convolution layers, $f_1$-$f_3$ represent three fully connection layers, $T_S$ represents 3D facial expression parameters of source, and $K_S$ represents 2D mouth key points of source.

The speech-to-facial parameter network is configured to predict corresponding 3D facial expression parameters of source and 2D mouth key points of source from an input audio. The 3D facial expression parameters have 10-dimensional coefficients. The 2D mouth key points are 20 key points used based on the Dlib algorithm. Since the 2D key points are composed of two coordinates (x,y), the 20 key points correspond to 40-dimensional vectors.

For the inputted source audio $A_I$, the audio features $F_A$ are first extracted through an RNN provided in the DeepSpeech method and then enter a CNN including four convolution layers $c_1$-$c_4$ and three fully connection layers $f_1$-$f_3$, and finally two groups of facial parameters are obtained through the CNN, respectively the 3D facial expression parameters $T_S$ and the 2D mouth key points $K_S$. The extracted audio feature $F_A$ may be a 16×29 tensor. The convolution layers $c_1$-$c_4$ includes 3×1 convolution kernels to reduce the dimension of $F_A$ to 8×32, 4×32, 2×64, and 1×64, respectively. The feature map outputted by the convolution layer $c_4$ obtains 128-, 64-, and 50-dimensional vectors respectively through the three fully connection layers $f_1$-$f_3$.

Figure 11:
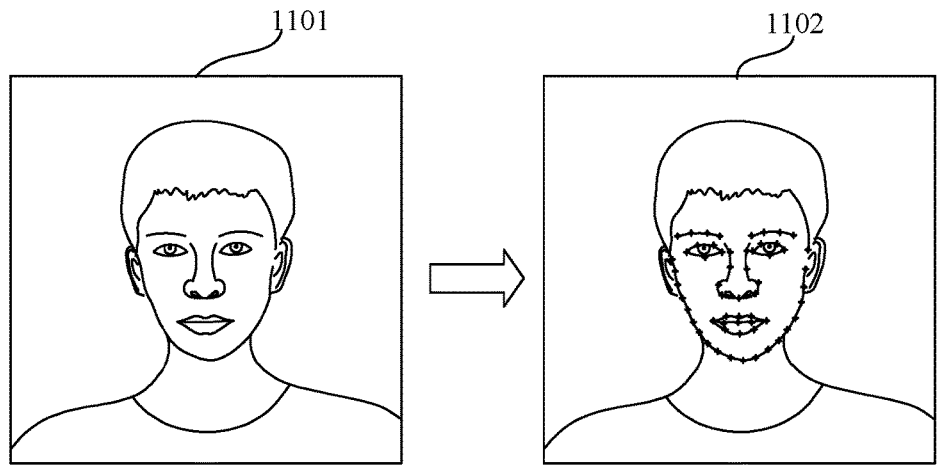
FIG. 11 is an effect diagram of the Dlib algorithm according to an embodiment of this disclosure.

Facial parameter extraction module 805 is configured to extract 2D mouth key point positions and 3D facial parameters of a target character from video frames of the target character. The 2D mouth key points are obtained through the Dlib algorithm. The algorithm can predict 68 key points on the face from an image. As shown in FIG. 11, FIG. 11 is an effect diagram of the Dlib algorithm according to an embodiment of this disclosure. The left panel 1101 is an original image, and points on the face in the right panel 1102 are the key points predicted through the Dlib algorithm. In this embodiment of this disclosure, only the predicted 20 mouth key points may be used as 2D facial parameters. 62-dimensional 3D facial parameters are predicted for each facial image, including 12-dimensional posture parameters, 40-dimensional shape parameters, and 10-dimensional expression parameters. The 2D mouth key points and the 3D facial expression parameters obtained by the facial parameter extraction module are replaced with the results obtained in the speech-to-facial parameter network, and the posture parameters and the shape parameters of the target character are retained, to obtain re-combined 3D facial parameters. Then, facial reconstruction is performed on the target character by using the re-combined 3D facial parameters to obtain a corresponding UV map, and new 2D mouth key point information is directly used as one of inputs for subsequent rendering.

Figure 12:
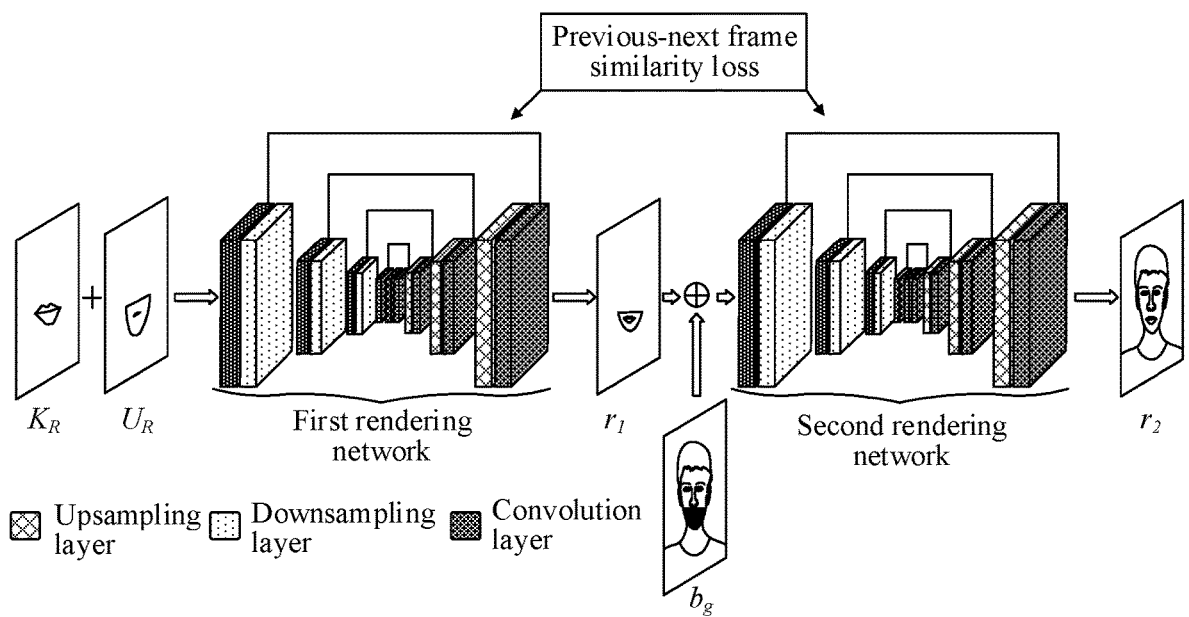
FIG. 12 is a block diagram of an image rendering model according to an embodiment of this disclosure.

FIG. 12 is a block diagram of an image rendering model, such as image rendering model 807, according to an embodiment of this disclosure. As shown in FIG. 12, 2D mouth key points, a UV map, and a background image are given. The image rendering model is configured to synthesize a final lip-sync speech video frame. During the implementation, 20 reconstructed mouth key points may be first connected to obtain a polygon as a mouth contour $K_R$, and then a UV map $U_R$ is mapped from 3D facial parameters based on a specific algorithm. The resolutions of $K_R$ and $U_R$ are both 256×256. $K_R$ and $U_R$ are concatenated to be used as an input of the image rendering model. The image rendering model is divided into two stages. The first stage (e.g., the first rendering network) synthesizes mouth region texture $r_1$, and $r_1$ a target video background frame $b_g$ (e.g., a background image) are concatenated as an input of the second rendering network. The second stage (e.g., the second rendering network) and the background image are combined to synthesize a final output $r_2$. The structures used in the two rendering networks are the U-Net network, The U-Net network is to continuously perform downsampling and convolution operations on an input to extract a depth feature and then gradually restore the resolution through an upsampling layer. A skip connection is introduced between downsampling and upsampling to retain feature information of different resolutions.

Figure 13:
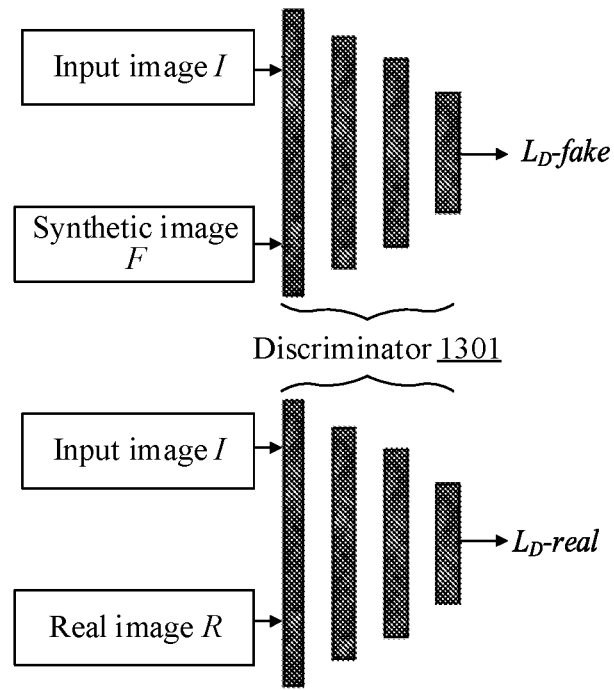
FIG. 13 is a block diagram of a condition-based generative adversarial network according to an embodiment of this disclosure.

In some embodiments, the rendering network may be trained by using a condition-based generative adversarial network (GAN). FIG. 13 is a block diagram of a condition-based GAN provided in an embodiment of this disclosure. For the rendering network, a predicted value F (e.g., a synthetic image F) and a real value R (e.g., a real image R) are respectively concatenated to an input I (e.g., an input image I) of the rendering network and then enter a discriminator 1301, to obtain two losses $L_{D\_fake}$ and $L_{D\_real}$ of the real value and the predicted value. A final loss function $L_D$ of the discriminator 1301 is expressed through the following formula (1-1):

$$L_D = (L_{D\_fake} + L_{D\_real}) * 0.5 \tag{1-1}$$

The rendering network may be regarded as a generator. The loss function includes a generative adversarial loss $L_{G\_GAN}$, $L_{G\_GAN}$ is the same as $L_{D\_fake}$ in the discriminator, except that the generator maximizes the value to make the discriminator unable to distinguish between true and false, and the discriminator minimizes the value to accurately identify a synthetic image. In addition, to make the synthetic image F and the real image R closer, the L1 loss is also used in the generator, as shown in the following formula (1-2):

$$L_{G\_L1} = L_1(F, R) \tag{1-2}$$

$L_{G\_L1}$ represents a loss value corresponding to the L1 loss.

Moreover, the synthetic image and the real image are further constrained at the feature level. For example, the synthetic image and the real image are respectively inputted into the VGG19 network, then the differences of feature maps outputted by the synthetic image and the real image in five activation layers are respectively calculated by using the L1 loss, and linear weighting is performed to obtain a final loss $L_{G\_VGG}$ as shown in the following formula (1-3):

$$L_{G\_VGG} = L_1(Relu_{f1}, Relu_{r1}) * \frac{1}{32} + L_1(Relu_{f2}, Relu_{r2}) * \frac{1}{16} + \tag{1-3}$$
$$L_1(Relu_{f3}, Relu_{r3}) * \frac{1}{8} + L_1(Relu_{f4}, Relu_{r4}) * \frac{1}{4} + L_1(Relu_{f5}, Relu_{r5})$$

$Relu_{fi}$ and $Relu_{ri}$ respectively represent feature maps of the synthetic image and the real image in an $i^{th}$ activation layer.

The above losses are calculated separately based on each frame, and no constraints are added between frames, which causes the final synthetic video to be not smooth or shaking. Therefore, an embodiment of this disclosure further introduces a previous-next frame similarity loss $L_{G\_Smi}$ to reduce the difference of previous and next frames between the synthetic video and a real video. Further referring to FIG. 8, a difference between a synthesized $t^{th}$ frame and a $(t-1)^{th}$ frame is first calculated, recorded as $d_{fake}$; similarly, a difference between a $t^{th}$ frame and a $(t-1)^{th}$ frame in a real video is calculated, recorded as $d_{real}$, $L_{G\_Smi}$ is to reduce a difference between $d_{fake}$ and $d_{real}$, that is, $\min[L_1(d_{fake}, d_{real})]$.

Then, the final loss function $L_G$ of the generator (e.g., the image rendering model) is the following formula (1-4):

$$L_G = L_{G\_GAN} + \alpha * L_{G\_L1} + \beta * L_{G\_VGG} + \gamma * L_{G\_Smi} \tag{1-4}$$

$\alpha$, $\beta$, and $\gamma$ are hyperparameters.

Figure 14:
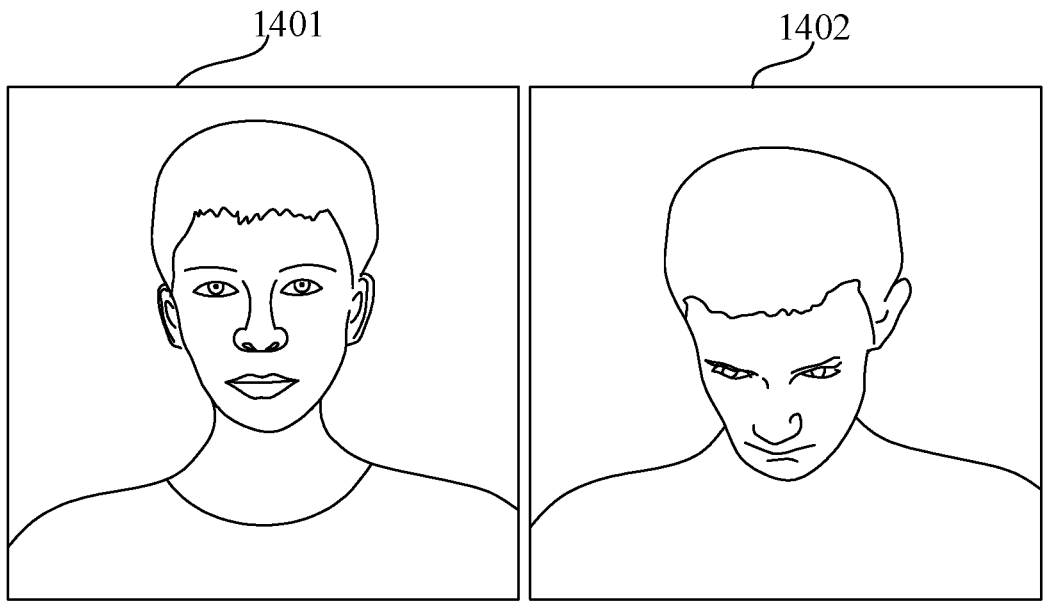
FIG. 14 is a schematic diagram of a virtual human sync speech video synthesized by the method in the related art.

Compared with other virtual human sync speech video generation algorithms in the related art, the method provided in the embodiments of this disclosure can synthesize results that are smoother and more realistic in time. FIG. 14 is a schematic diagram of a virtual human sync speech video synthesized by the method in the related art. As shown in FIG. 14, the synthesized video frames are often not smooth enough and not realistic enough, and the picture of a video frame 1401 and the picture of a video frame 1402 are not continuous enough.

Figure 15:
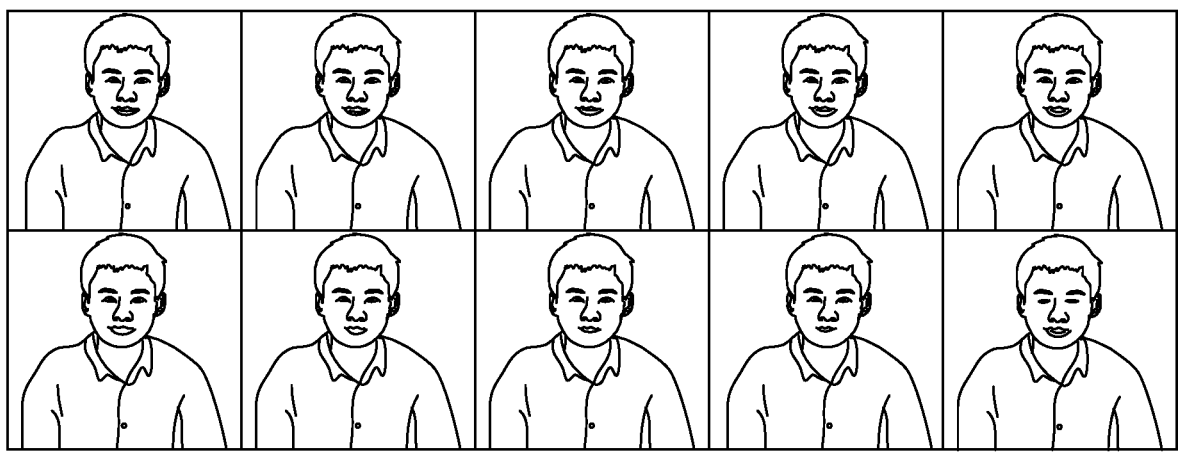
FIG. 15 is a schematic diagram of a synthetic video generated by an action driving method of a target object according to an embodiment of this disclosure.

However, the embodiments of this disclosure overcome the above problem by combining 2D and 3D facial parameters and introducing a previous-next frame similarity loss, to generate an effect of 10 continuous video frames of a final synthetic video as shown in FIG. 15. The order of the 10 video frames is from left to right and from top to bottom. It can be seen from FIG. 15 that the synthetic video generated by the embodiments of this disclosure is smoother and more realistic, and has a better visual effect.

It is to be noted that, the method of the embodiments of this disclosure pertains to a text-driving method, which can generate a target human speech video from a given text and any video of a target character with the mature TTS technology. Typical application scenarios of the embodiments of this disclosure include the AI education industry emerging in recent years. Different from a current audio-driving virtual teacher generation solution, the embodiments of this disclosure expand the input requirements into text or audio, which can further enhance the user experience.

In some embodiments, in the speech-to-facial parameter network, a CNN is used to predict a facial parameter for an audio feature extracted by using DeepSpeech. However, for this module, the model type of a deep convolutional network is not limited in the embodiments of this disclosure. For example, an RNN or GAN may be used to replace the CNN, which can be selected according to the requirements of the actual application or product for accuracy and efficiency. Similarly, the U-Net structure can not only be used for two rendering networks in the image rendering model, but also be used for other encoding-decoding structures, such as an hourglass network.

The following continues to describe an exemplary structure in which an action driving apparatus 354 of a target object provided in an embodiment of this disclosure is implemented as a software module. In some embodiments, as shown in FIG. 3, the software module in the action driving apparatus 354 of a target object stored in the memory 350 may be an action driving apparatus of a target object in the server 300. The apparatus may include an acquiring module 3541, a facial parameter conversion module 3542, a parameter extraction module 3543, an image reconstruction module 3544, and a generating module 3545. One or more modules, submodules, and/or units of the apparatus can be implemented by processing circuitry, software, or a combination thereof, for example.

The acquiring module 3541 is configured to acquire a source audio and acquire a target video, the target video including the target object. The facial parameter conversion module 3542 is configured to perform facial parameter conversion on an audio parameter of the source audio at each moment to obtain a source parameter of the source audio at a corresponding moment. The parameter extraction module 3543 is configured to perform parameter extraction on the target video to obtain a target parameter of the target video. The image reconstruction module 3544 is configured to perform image reconstruction on the target object in the target video according to a combined parameter obtained by combining the source parameter and the target parameter, to obtain a reconstructed image. The generating module 3545 is configured to generate a synthetic video through the reconstructed image, the synthetic video including the target object, and an action of the target object being corresponding to the source audio.

In some embodiments, the acquiring module 3541 is further configured to: acquire a source text and perform text parsing on the source text, to obtain a linguistic feature of the source text; perform acoustic parameter extraction on the linguistic feature to obtain an acoustic parameter of the source text on a time domain; perform conversion on the acoustic parameter to obtain an audio waveform of the source text on a frequency domain; and use an audio corresponding to the audio waveform as the source audio.

In some embodiments, the source parameter includes: an expression parameter and a mouth key point parameter; and the facial parameter conversion module 3542 is further configured to: perform the following operations for the audio parameter of the source audio at any moment: performing feature extraction on the audio parameter to obtain an audio feature vector of the source audio; and performing convolution processing and full connection processing sequentially on the audio feature vector to obtain the expression parameter and the mouth key point parameter of the source audio at the moment.

In some embodiments, the facial parameter conversion module 3542 is further configured to: perform the convolution processing on the audio feature vector through at least two first convolution layers including a specific convolution kernel to obtain a convolution processing vector; and perform the full connection processing on the convolution processing vector through at least two fully connection layers to obtain a full connection processing vector, the full connection processing vector including a vector corresponding to the expression parameter and a vector corresponding to the mouth key point parameter, and a sum of dimensions of the vector corresponding to the expression parameter and the vector corresponding to the mouth key point parameter being equal to a dimension of the full connection processing vector.

In some embodiments, the target parameter includes: a target mouth key point parameter and a target facial parameter; and the parameter extraction module 3543 is further configured to: perform mouth parameter extraction on the target object in the target video to obtain the target mouth key point parameter; and perform facial parameter extraction on the target object in the target video to obtain the target facial parameter.

In some embodiments, the image reconstruction module 3544 is further configured to: combine the source parameter and the target parameter to obtain the combined parameter; perform image reconstruction on the target object in the target video according to the combined parameter to obtain a mouth contour map and a facial coordinate map; and use the mouth contour map and the facial coordinate map as the reconstructed image.

In some embodiments, the source parameter includes: an expression parameter and a mouth key point parameter; the target parameter includes a target mouth key point parameter and a target facial parameter; the target facial parameter includes: a target posture parameter, a target shape parameter, and a target expression parameter; and the image reconstruction module 3544 is further configured to: replace the target expression parameter in the target facial parameter through the expression parameter to obtain a replaced facial parameter; replace the target mouth key point parameter through the mouth key point parameter to obtain a replaced mouth key point parameter; and use the replaced facial parameter and the replaced mouth key point parameter as the combined parameter.

In some embodiments, the reconstructed image includes the replaced facial parameter and the replaced mouth key point parameter; and the generating module 3545 is further configured to: call an image rendering model based on the replaced facial parameter, the replaced mouth key point parameter, and a background image corresponding to the target video at each moment; perform mouth region rendering on the replaced facial parameter at each moment and the replaced mouth key point parameter at each moment through a first rendering network in the image rendering model, to obtain a mouth region texture image at each moment; concatenate the mouth region texture image at each moment and the background image through a second rendering network in the image rendering model, to obtain a synthetic image at each moment; and determine the synthetic video including the target object and the source audio according to the synthetic image at each moment.

In some embodiments, the first rendering network includes at least one second convolution layer, at least one first downsampling layer, and at least one first upsampling layer; and the generating module 3545 is further configured to: perform convolution processing and downsampling processing on the replaced facial parameter and the replaced mouth key point parameter through the second convolution layer and the first downsampling layer, to obtain a depth feature of the reconstructed image; and perform upsampling processing on the depth feature of the reconstructed image through the first upsampling layer, to obtain the mouth region texture image.

In some embodiments, the second rendering network includes at least one third convolution layer, at least one second downsampling layer, and at least one second upsampling layer; and the generating module 3545 is further configured to: perform convolution processing and downsampling processing on the mouth region texture image and the background image through the third convolution layer and the second downsampling layer, to obtain depth features of the mouth region texture image and the background image; and perform upsampling processing on the depth features through the second upsampling layer, to obtain the synthetic image at each moment.

In some embodiments, the image rendering model is obtained by training through the following steps: calling an image rendering model based on a reconstructed image sample and a target image sample; performing feature extraction and mouth region rendering on the reconstructed image sample and the target image sample through a first rendering network of the image rendering model, to obtain a mouth texture image sample; concatenating the mouth texture image sample and the target image sample through a second rendering network in the image rendering model, to obtain a synthetic image sample; calling a preset loss model based on the synthetic image sample to obtain a loss result; and modifying parameters in the first rendering network and the second rendering network according to the loss result to obtain the image rendering model after training.

In some embodiments, the image rendering model is obtained by training through the following steps: acquiring a real synthetic image corresponding to the reconstructed image sample and the target image sample; and concatenating the synthetic image sample and the real synthetic image, inputting the concatenated image into the preset loss model, and calculating a previous-next frame similarity loss for the synthetic image sample and the real synthetic image through the preset loss model, to obtain the loss result.

It is to be noted that, the description of the apparatus in the embodiments of this disclosure is similar to the description of the method embodiments. The apparatus embodiments have beneficial effects similar to the method embodiments and thus are not repeatedly described. For technical details not disclosed in the apparatus embodiments, refer to the description of the method embodiments of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

An embodiment of this disclosure provides a computer program product or a computer program. The computer program product or the computer program includes a computer instruction, and the computer instruction is stored in a computer-readable storage medium. A processor of a computer device reads the computer instruction from the computer-readable storage medium, and the processor executes the computer instruction, to cause the computer device to perform the above method in the embodiments of this disclosure.

An embodiment of this disclosure provides a storage medium storing an executable instruction. When the executable instruction is executed by a processor, the processor is caused to perform the method in the embodiments of this disclosure, for example, the method shown in FIG. 4.

In some embodiments, the storage medium may be a computer-readable storage medium (e.g., a non-transitory computer-readable storage medium) such as a ferromagnetic random access memory (FRAM), a read only memory (ROM), a programmable read only memory (PROM), an erasable programmable read only memory (EPROM), an electrically erasable programmable read only memory (EEPROM), a flash memory, a magnetic surface memory, an optic disc, or a compact disk-read only memory (CD-ROM); or may be any device including one of or any combination of the foregoing memories.

In some embodiments, the executable instruction may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instruction may, but does not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (e.g., be stored in files of one or more modules, subprograms, or code parts). In an example, the executable instruction may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely exemplary embodiments of this disclosure and are not intended to limit the scope of this disclosure. Other embodiments within the scope of this disclosure.

What is claimed is:

1. A method for synchronizing an action of a target object with source audio, the method comprising:

performing facial parameter conversion on an audio parameter of the source audio at different time periods to obtain source parameter information of the source audio at the respective time periods, the source parameter information including an expression parameter and a mouth key point parameter for each of the time periods;

performing parameter extraction on a target video that includes the target object to obtain target parameter information of the target video, the target parameter information including a target mouth key point parameter and a target facial parameter, the target facial parameter including at least one of a target posture parameter, a target shape parameter, or a target expression parameter;

replacing the target expression parameter in the target facial parameter with the expression parameter of one of the time periods to obtain a replaced facial parameter;

replacing the target mouth key point parameter with the mouth key point parameter of the one of the time periods to obtain a replaced mouth key point parameter;

performing, by processing circuitry, image reconstruction on the target object in the target video based on the replaced facial parameter and the replaced mouth key point parameter, to obtain a reconstructed image; and generating a synthetic video based on the reconstructed image, the synthetic video including the target object, and the action of the target object being synchronized with the source audio, wherein the generating the synthetic video includes:
performing mouth region rendering based on the reconstructed image including the replaced facial parameter and the replaced mouth key point parameter with a first rendering network of an image rendering model, to obtain a mouth region texture image, and
concatenating the mouth region texture image and a background image corresponding to the target video with a second rendering network in the image rendering model, to generate a synthetic image of the synthetic video.

2. The method according to claim 1, further comprising:
acquiring a source text;
parsing the source text to obtain a linguistic feature of the source text;
obtaining acoustic parameter information of the source text in a time domain based on the linguistic feature;
obtaining an audio waveform of the source text in a frequency domain based on the acoustic parameter information; and
wherein the source audio corresponds to the audio waveform.

3. The method according to claim 1, wherein
the performing the facial parameter conversion on the audio parameter of the source audio comprises:
performing feature extraction on the audio parameter to obtain an audio feature vector of the source audio, and
performing convolution processing and full connection processing sequentially on the audio feature vector to obtain the expression parameter and the mouth key point parameter of the source audio at the one of the time periods.

4. The method according to claim 3, wherein
the performing the convolution processing and the full connection processing comprises:
performing the convolution processing on the audio feature vector with at least two first convolution layers including a convolution kernel to obtain a convolution processing vector, and
performing the full connection processing on the convolution processing vector with at least two full connection layers to obtain a full connection processing vector; and
the full connection processing vector includes a vector corresponding to the expression parameter and a vector corresponding to the mouth key point parameter at the one of the time periods, and a sum of dimensions of the vector corresponding to the expression parameter and the vector corresponding to the mouth key point parameter being equal to a dimension of the full connection processing vector.

5. The method according to claim 1, wherein
the performing the parameter extraction on the target video comprises:
performing mouth parameter extraction on the target object in the target video to obtain the target mouth key point parameter, and
performing facial parameter extraction on the target object in the target video to obtain the target facial parameter.

6. The method according to claim 1, wherein
before the performing the image reconstruction on the target object in the target video, the method further includes combining the source parameter information and the target parameter information to obtain combined parameter information;
the performing the image reconstruction on the target object in the target video includes performing the image reconstruction on the target object in the target video according to the combined parameter information to obtain a mouth contour map and a facial coordinate map; and
the reconstructed image is based on the mouth contour map and the facial coordinate map.

7. The method according to claim 1, wherein
the generating the synthetic video comprises:
calling the image rendering model based on the replaced facial parameter, the replaced mouth key point parameter, and a background image corresponding to the target video at each of the time periods;
performing mouth region rendering on the replaced facial parameter at each of the time periods and the replaced mouth key point parameter at each of the time periods with the first rendering network in the image rendering model, to obtain a mouth region texture image at each of the time periods;
concatenating the mouth region texture image at each of the time periods and the background image with the second rendering network in the image rendering model, to obtain a synthetic image at each of the time periods; and determining the synthetic video of the target object and the source audio according to the synthetic image at each of the time periods.

8. The method according to claim 7, wherein
the first rendering network includes a second convolution layer, a first downsampling layer, and a first upsampling layer; and
the performing the mouth region rendering comprises:
performing, for a respective one of the time periods, convolution processing and downsampling processing on the replaced facial parameter and the replaced mouth key point parameter with the second convolution layer and the first downsampling layer, to obtain a depth feature of the reconstructed image; and
performing, for the respective one of the time periods, upsampling processing on the depth feature of the reconstructed image with the first upsampling layer, to obtain the mouth region texture image.

9. The method according to claim 7, wherein
the second rendering network includes a third convolution layer, a second downsampling layer, and a second upsampling layer; and
the concatenating comprises:
performing convolution processing and downsampling processing on the mouth region texture image and the background image through the third convolution layer and the second downsampling layer, to obtain depth features of the mouth region texture image and the background image; and
performing upsampling processing on the depth features through the second upsampling layer, to obtain the synthetic image at each of the time periods.

10. The method according to claim 7, further comprising:
calling the image rendering model based on a reconstructed image sample and a target image sample;
performing feature extraction and mouth region rendering on the reconstructed image sample and the target image sample with the first rendering network of the image rendering model, to obtain a mouth texture image sample;
concatenating the mouth texture image sample and the target image sample with the second rendering network in the image rendering model, to obtain a synthetic image sample;
calling a preset loss model based on the synthetic image sample to obtain a loss result; and
modifying parameters in the first rendering network and the second rendering network according to the loss result to obtain the image rendering model after training.

11. The method according to claim 10, wherein the calling the preset loss model comprises:
acquiring a real synthetic image corresponding to the reconstructed image sample and the target image sample; and
concatenating the synthetic image sample and the real synthetic image, inputting the concatenated image into the preset loss model, and calculating a previous-next frame similarity loss for the synthetic image sample and the real synthetic image through the preset loss model, to obtain the loss result.

12. An information processing apparatus, comprising:
processing circuitry configured to:
perform facial parameter conversion on an audio parameter of a source audio at different time periods to obtain source parameter information of the source audio at the respective time periods, the source parameter information including an expression parameter and a mouth key point parameter for each of the time periods;
perform parameter extraction on a target video that includes a target object to obtain target parameter information of the target video, the target parameter information including a target mouth key point parameter and a target facial parameter, the target facial parameter including at least one of a target posture parameter, a target shape parameter, or a target expression parameter;
replace the target expression parameter in the target facial parameter with the expression parameter of one of the time periods to obtain a replaced facial parameter;
replace the target mouth key point parameter with the mouth key point parameter of the one of the time periods to obtain a replaced mouth key point parameter;
perform image reconstruction on the target object in the target video based on the replaced facial parameter and the replaced mouth key point parameter, to obtain a reconstructed image; and
generate a synthetic video based on the reconstructed image, the synthetic video including the target object, and an action of the target object being synchronized with the source audio, wherein
the processing circuitry is configured to:
perform mouth region rendering based on the reconstructed image including the replaced facial parameter and the replaced mouth key point parameter with a first rendering network of an image rendering model, to obtain a mouth region texture image, and
concatenate the mouth region texture image and a background image corresponding to the target video with a second rendering network in the image rendering model, to generate a synthetic image of the synthetic video.

13. The information processing apparatus according to claim 12, wherein the processing circuitry is further configured to:
acquire a source text;
parse the source text to obtain a linguistic feature of the source text;
obtain acoustic parameter information of the source text in a time domain based on the linguistic feature;
obtain an audio waveform of the source text in a frequency domain based on the acoustic parameter information; and
the source audio corresponds to the audio waveform.

14. The information processing apparatus according to claim 13, wherein
the processing circuitry is configured to:
perform feature extraction on the audio parameter to obtain an audio feature vector of the source audio, and
perform convolution processing and full connection processing sequentially on the audio feature vector to obtain the expression parameter and the mouth key point parameter of the source audio at the one of the time periods.

15. The information processing apparatus according to claim 14, wherein the processing circuitry is configured to:

perform the convolution processing on the audio feature vector with at least two first convolution layers including a convolution kernel to obtain a convolution processing vector, and perform the full connection processing on the convolution processing vector with at least two full connection layers to obtain a full connection processing vector; and the full connection processing vector includes a vector corresponding to the expression parameter and a vector corresponding to the mouth key point parameter at the one of the time periods, and a sum of dimensions of the vector corresponding to the expression parameter and the vector corresponding to the mouth key point parameter being equal to a dimension of the full connection processing vector.

16. The information processing apparatus according to claim 12, wherein the processing circuitry is configured to:

perform mouth parameter extraction on the target object in the target video to obtain the target mouth key point parameter, and perform facial parameter extraction on the target object in the target video to obtain the target facial parameter.

17. The information processing apparatus according to claim 12, wherein the processing circuitry is configured to combine the source parameter information and the target parameter information to obtain combined parameter information;

the processing circuitry is configured to perform the image reconstruction on the target object in the target video according to the combined parameter information to obtain a mouth contour map and a facial coordinate map; and the reconstructed image is based on the mouth contour map and the facial coordinate map.

18. A system for synchronizing an action of a target object with source audio, the system comprising:

a terminal including processing circuitry that is configured to transmit an action synchronization request of the target object to an information processing apparatus, the action synchronization request including the source audio and a target video that includes the target object; and the information processing apparatus according to claim 12.

19. A non-transitory computer-readable storage medium, storing instructions which when executed by a processor cause the processor to perform:

performing facial parameter conversion on an audio parameter of a source audio at different time periods to obtain source parameter information of the source audio at the respective time periods, the source parameter information including an expression parameter and a mouth key point parameter for each of the time periods;

performing parameter extraction on a target video that includes a target object to obtain target parameter information of the target video, the target parameter information including a target mouth key point parameter and a target facial parameter, the target facial parameter including at least one of a target posture parameter, a target shape parameter, or a target expression parameter;

replacing the target expression parameter in the target facial parameter with the expression parameter of one of the time periods to obtain a replaced facial parameter;

replacing the target mouth key point parameter with the mouth key point parameter of the one of the time periods to obtain a replaced mouth key point parameter;

performing image reconstruction on the target object in the target video based on the replaced facial parameter and the replaced mouth key point parameter, to obtain a reconstructed image; and generating a synthetic video based on the reconstructed image, the synthetic video including the target object, and an action of the target object being synchronized with the source audio, wherein the generating the synthetic video includes:

performing mouth region rendering based on the reconstructed image including the replaced facial parameter and the replaced mouth key point parameter with a first rendering network of an image rendering model, to obtain a mouth region texture image, and concatenating the mouth region texture image and a background image corresponding to the target video with a second rendering network in the image rendering model, to generate a synthetic image of the synthetic video.

* * * * *